(12) United States Patent
Irazoqui et al.

(10) Patent No.: US 10,176,933 B2
(45) Date of Patent: Jan. 8, 2019

(54) SUPER-CAPACITOR AND ARRANGEMENT FOR MINIATURE IMPLANTABLE MEDICAL DEVICES

(71) Applicant: Purdue Research Foundation, West Lafayette, IN (US)

(72) Inventors: Pedro P. Irazoqui, Lafayette, IN (US); Oren Gall, Lafayette, IN (US); Chuizhou Meng, Troy, NY (US); Jimin Maeng, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 105 days.

(21) Appl. No.: 14/438,620

(22) PCT Filed: Oct. 25, 2013

(86) PCT No.: PCT/US2013/066924
§ 371 (c)(1),
(2) Date: Apr. 25, 2015

(87) PCT Pub. No.: WO2014/066824
PCT Pub. Date: May 1, 2014

(65) Prior Publication Data
US 2015/0287544 A1    Oct. 8, 2015

Related U.S. Application Data

(60) Provisional application No. 61/873,426, filed on Sep. 4, 2013, provisional application No. 61/718,670, filed on Oct. 25, 2012.

(51) Int. Cl.
*H01G 11/36*    (2013.01)
*H01G 11/56*    (2013.01)
(Continued)

(52) U.S. Cl.
CPC ............ *H01G 11/36* (2013.01); *H01G 11/48* (2013.01); *H01G 11/56* (2013.01); *H01G 11/84* (2013.01);
(Continued)

(58) Field of Classification Search
CPC ......... H01G 11/26; H01G 11/36; H01G 11/00
See application file for complete search history.

(56) References Cited

U.S. PATENT DOCUMENTS

| | | | |
|---|---|---|---|
| 6,454,816 B1* | 9/2002 | Lee | B82Y 10/00 29/25.03 |
| 2008/0239620 A1* | 10/2008 | Min | H01G 4/005 361/305 |

(Continued)

OTHER PUBLICATIONS

Muratore et al., Nanoparticle decoration of carbon nanotubes by sputtering, Feb. 2013, Carbon 57 (2013), 274-281.*

(Continued)

*Primary Examiner* — Eric W Thomas
(74) *Attorney, Agent, or Firm* — Piroozi-IP, LLC

(57) ABSTRACT

An energy storage device includes first and second electrodes and a solid state electrolyte. The first electrode includes carbon nanotubes, a conductive polymer, and a metallization on said carbon nanotubes. The second electrode similarly includes carbon nanotubes, a conductive polymer, and a metallization on said carbon nanotubes. The solid state electrolyte is disposed at least in part between the first electrode and the second electrode. In at least some embodiments, the conductive polymer of the first electrode includes polyaniline, and the metallization of the first electrode is a gold metallization.

12 Claims, 12 Drawing Sheets

(51) Int. Cl.
H02J 7/02 (2016.01)
H02J 50/00 (2016.01)
H02J 50/27 (2016.01)
H01G 11/48 (2013.01)
H01G 11/84 (2013.01)
H01G 11/86 (2013.01)

(52) U.S. Cl.
CPC .............. *H01G 11/86* (2013.01); *H02J 7/025* (2013.01); *H02J 50/00* (2016.02); *H02J 50/27* (2016.02); *Y02E 60/13* (2013.01)

(56) References Cited

U.S. PATENT DOCUMENTS

| | | | | |
|---|---|---|---|---|
| 2010/0097742 | A1* | 4/2010 | Adzic | B82Y 30/00 361/502 |
| 2010/0261058 | A1* | 10/2010 | Lopatin | H01M 4/133 429/212 |
| 2011/0235241 | A1* | 9/2011 | Park | H01G 9/02 361/502 |

OTHER PUBLICATIONS

Chen, G., et al., A Cubic-Millimeter Energy-Autonomous Wireless Intraocular Pressure Monitor. IEEE 2011 IEEE International Solid-State Circuits Conference. 310-312.

Chow, E., et al., Fully Wireless Implantable Cardiovascular Pressure Monitor Integrated with a Medical Stent. IEEE Transactions on Biomedical Engineering, vol. 57, No. 6, Jun. 2010, 1487-1496.

Chow, E. et al., A Miniature-Implantable RF-Wireless Active Glaucoma Intraocular Pressure Monitor. IEEE Transactions on Biomedical Circuits and Systems, vol. 4, No. 6, Dec. 2010, 340-349.

Ha, D. et al., Polymer-based miniature flexible capacitive pressure sensor for intraocular pressure (IOP) monitoring inside a mouse eye. Biomed Microdevices (2012) 14:207-215.

Maeng, J., et al., Parylene Interposer as Thin Flexible 3-D Packaging Enabler for Wireless Applications. IEEE Transactions on Microwave Theory and Techniques, vol. 59, No. 12, Dec. 2011, 3410-3418.

Miller, L., et al., Integration of a low frequency, tunable MEMS piezoelectric energy harvester and a thick film micro capacitor as a power supply system for wireless sensor nodes. IEEE, 2009, 2627-2634.

Myatt, D., et al., Real-time dense stereo system with rectification for autonomous navigation and mapping. Airborne Intelligence, Surveillance, Reconnaissance (ISR) Systems and Applications VI, edited by Daniel J. Henry. Proc. of SPIE vol. 7307 73070C-1-11.

Chmiola, J., et al., Monolithic Carbide-Derived Carbon Films for Micro-Supercapacitors. Science, 2010, vol. 328, 480-483.

Yan, Y., et al., Growth of polyaniline nanowhiskers on mesoporous carbon for supercapacitor application. Journal of Power Sources 196 (2011) 7835-7840.

Brodd, R., et al., Batteries, 1977 to 2002. Journal of the Electrochemical Society, 151 (3) K1-K11, 2004.

Armand, M., et al., Building better batteries, Nature, 2008, vol. 451, 652-657.

Chalasani, S., et al., A Survey of Energy Harvesting Sources for Embedded Systems. IEEE, 2008, 442-447.

Simon, P., et al., Materials for electrochemical capacitors. Nature Material., 2008, vol. 7, 845-854.

Pech, D., et al., Ultrahigh-power micrometre-sized supercapacitors based on onion-like carbon. Nature Nanotechnology, 2010, vol. 5, 651-654.

Sun, W., et al., Preparation and characterization of polypyrrole films for three-dimensional micro supercapacitor. Journal of Power Sources 193 (2009) 924-929.

Wang, Y., et al., Ordered Whiskerlike Polyaniline Grown on the Surface of Mesoporous Carbon and Its Electrochemical Capacitance Performance. Adv. Mater. 2006, 18, 2619-2623.

Liu, C., et al., Planar ultracapacitors of miniature interdigital electrode loaded with hydrous $RuO_2$ and $RuO_2$ nanorods. Electrochimica Acta 55 (2010) 5768-5774.

Sun, W., et al., Symmetric redox supercapacitor based on microfabrication with three-dimensional polypyrrole electrodes. Journal of Power Sources 195 (2010) 7120-7125.

Shen, C., et al., A high-performance three-dimensional micro supercapacitor based on self-supporting composite materials. Journal of Power Sources 196 (2011) 10465-10471.

Miller, J., et al., Electrochemical Capacitors: Challenges and Opportunities for Real-World Applications. The Electrochemical Society Interface • Spring 2008, 53-57.

Beidaghi, M., et al., Micro-supercapacitors based on three dimensional interdigital polypyrrole/C-MEMS electrodes. Electrochimica Acta 56 (2011) 9508-9514.

Liu, C. et al., Electrochemical micro-capacitors of patterned electrodes loaded with manganese oxide and carbon nanotubes. Journal of Power Sources 196 (2011) 5761-5768.

Durou, H. et al., Wafer-level fabrication process for fully encapsulated micro-supercapacitors with high specific energy. Microsyst Technol (2012) 18:467-473.

Li, S., et al., Nanostructured manganese dioxides as active materials for micro-supercapacitors. Micro & Nano Letters, 2012, vol. 7, Iss. 8, pp. 744-748.

Meng, C., et al., Highly Flexible and All-Solid-State Paperlike Polymer Supercapasitors. Nano Lett. 2010, 10, 4025-4031.

Sivakkumar, S., et al., Electrochemical performance of polyaniline nanofibres and polyaniline/multi-walled carbon nanotube composite as an electrode material for aqueous redox supercapacitors. Journal of Power Sources 171 (2007) 1062-1068.

Sung, J. et al., Flexible micro-supercapacitors. Journal of Power Sources 162 (2006) 1467-1470.

Wang, K., et al., An All-Solid-State Flexible Micro-supercapacitor on a Chip. Adv. Energy Mater. 2011, 1, 1068-1072.

Xue, M., et al., Microfluidic etching for fabrication of flexible and all-solid-state micro supercapacitor based on $MnO_2$ nanoparticles. Nanoscale, 2011, 3, 2703-2078.

Meng, C., et al., Flexible carbon nanotube/polyaniline paper-like films and their enhanced electrochemical properties. Electrochemistry Communications 11 (2009) 186-189.

Ho, C., et al., Tailoring Electrochemical Capacitor Energy Storage Using Direct Write Dispenser Printing. ECS Transactions, 16 (1) 35-47 (2008).

Dean, R., Novel Biomedical Implant Interconnects Utilizing Micromachined LCP. Nanoengineering: Fabrication, Properties, Optics, and Devices, edited by Elizabeth A. Dobisz, Louay A. Eldada, Proceedings of SPIE vol. 5515 88-99 (SPIE, Bellingham, WA, 2004).

Ha, D., et al., 3D Packaging Technique on Liquid Crystal Polymer (LCP) for Miniature Wireless Biomedical Sensor. IEEE IMS 2010, 612-615.

Chung, D., et al., Low Loss Multilayer Transitions using Via Technology on LCP from DC to 40 GHz. IEEE 2009 Electronic Components and Technology Conference. 2009, 2025-2029.

Sun, W., et al., Fabrication and tests of a novel three dimensional micro supercapacitor. Microelectronic Engineering 86 (2009) 1307-1310.

Gogotsi, Y., et al., True Performance Metrics in Electrochemical Energy Storage. Science, 2011, vol. 334, 917-918.

Shih, Y., et al., A 2.3 W Wireless Intraocular Pressure/Temperature Monitor. IEEE Journal of Solid-State Circuits, vol. 46, No. 11, Nov. 2011, 2592-2601.

Frackowiak, E., Carbon materials for supercapacitor application. Phys. Chem. Chem. Phys., 2007, 9, 1774-1785.

Simjee, F., et al., Efficient Charging of Supercapacitors for Extended Lifetime of Wireless Sensor Nodes. IEEE Transactions on Power Electronics, vol. 23, No. 3, May 2008, 1526-1526.

Pan, J., et al., Hierarchical nanostructured conducting polymer hydrogel with high electrochemical activity. PNAS Jun. 12, 2012, vol. 109, No. 24, 9287-9292.

Sheng, K., et al., Ultrahigh-rate supercapacitors based on eletrochemically reduced graphene oxide for ac line-filtering. Scientific Reports, 2: 247, 1-5.

(56) References Cited

OTHER PUBLICATIONS

Sung, J., et al., Fabrication of microcapacitors using conducting polymer microelectrodes. Journal of Power Sources 124 (2003) 343-350.
Raghunathan, S., et al., Ultra Low-Power Algorithm Design for Implantable Devices: Application to Epilepsy Prostheses. J. Low Power Electron. Appl. 2011, 1, 175-203.
Chen, H., et al., Energy Storage and Management System With Carbon Nanotube Supercapacitor and Multidirectional Power Delivery Capability for Autonomous Wireless Sensor Nodes. IEEE Transactions on Power Electronics, vol. 25, No. 12, Dec. 2010, 2897-2909.
Richelli, A., et al., A 0.2-1.2 V DC/DC Boost Converter for Power Harvesting Applications. IEEE Transactions on Power Electronics, vol. 24, No. 6, Jun. 2009, 1541-1546.
Chow, E. et al., Wireless Powering and the Study of RF Propagation Through Ocular Tissue for Development of Implantable Sensors. IEEE Transactions on Antennas and Propagation, vol. 59, No. 6, Jun. 2011 2379-2387.

\* cited by examiner

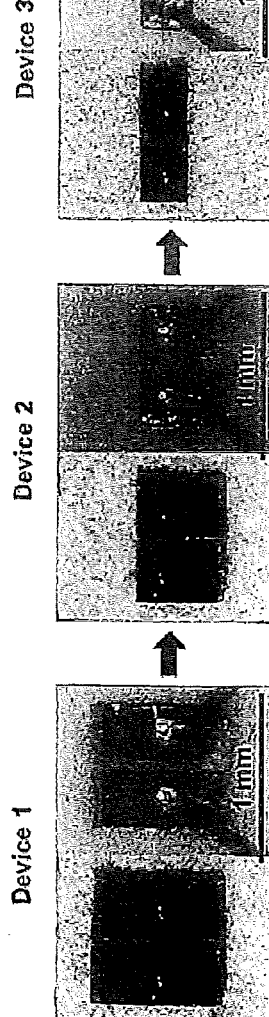
FIG. 10A
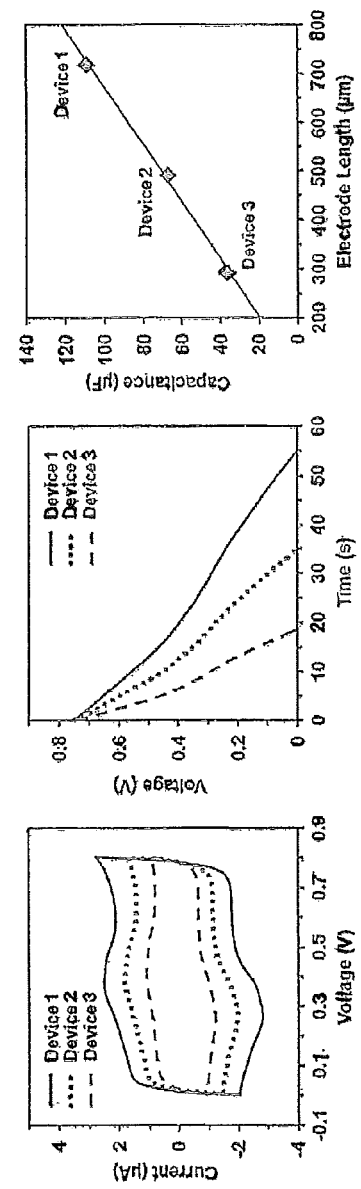
FIG. 10B
FIG. 10C
FIG. 10D

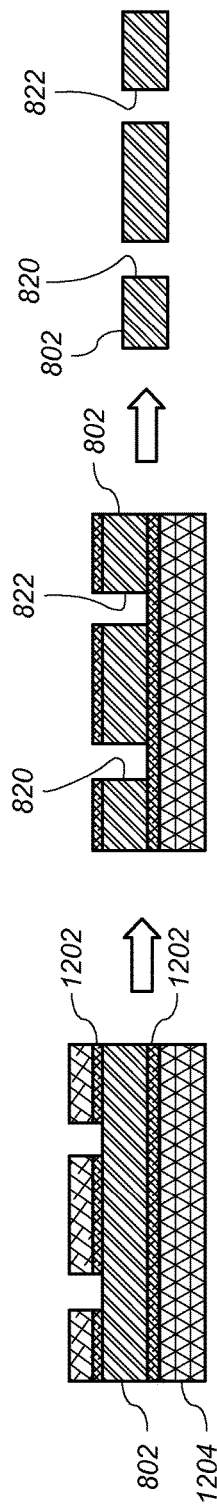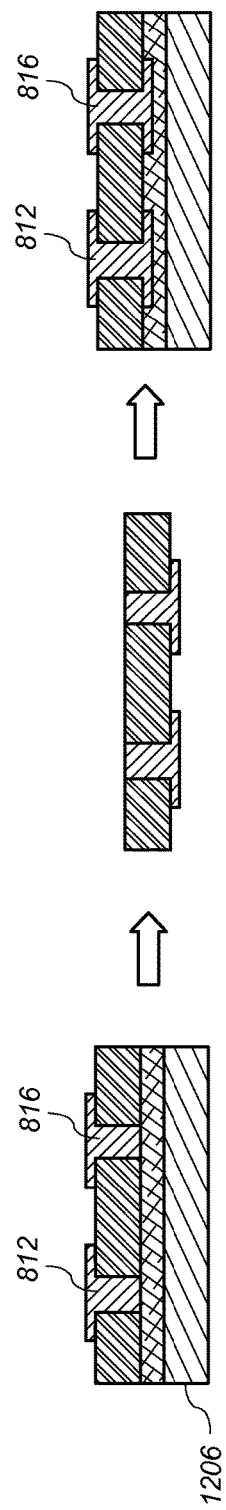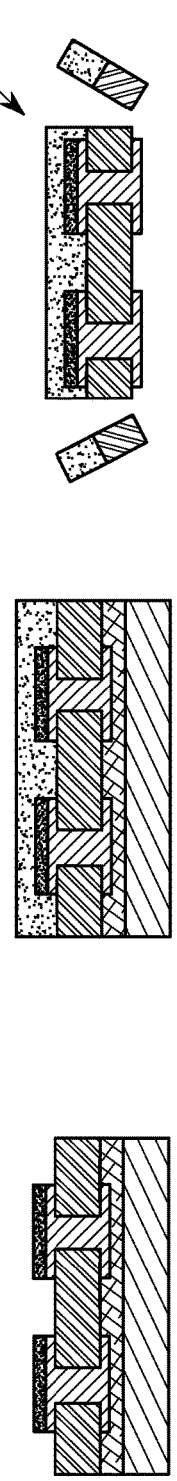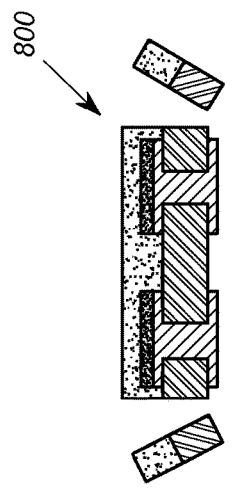
FIG. 12A  FIG. 12B  FIG. 12C  FIG. 12D  FIG. 12E

SUPER-CAPACITOR AND ARRANGEMENT FOR MINIATURE IMPLANTABLE MEDICAL DEVICES

This application claims priority to, and is a U.S. § 371 national stage entry of, International Patent Application Serial No. PCT/US2013/066924 filed Oct. 25, 2013 which is related to and claims the benefit of U.S. Provisional Patent Application Ser. No. 61/718,670, filed Oct. 25, 2012, and U.S. Provisional Patent Application Ser. No. 61/873,426, filed Sep. 4, 2013, each of which is incorporated herein by reference in its entirety.

This invention was made with government support under N66001-12-1-4029 awarded by the Defense Advanced Research Projects Agency. The government has certain rights in the invention.

FIELD OF THE INVENTION

The present invention relates generally to energy storage devices, and more particularly, to energy storage devices that may be used on implantable medical devices.

BACKGROUND

Wireless far-field remote powering has the potential to revolutionize the world of medical devices. This technology addresses a growing need in the medical device field, and allows for incredible size reductions, which is beneficial in a variety of areas including neural, ocular, and cardiovascular applications. As a result of recent advances in semiconductor, packaging, and bio-interface technology, state-of-the-art millimeter-sized wireless implantable devices exits or are under development, for clinical applications such as optogenetic stimulator (OGS) for epilepsy (5 mm×10 mm), cardiovascular monitoring (3 mm×6 mm), glaucoma intraocular pressure (IOP) monitoring for mouse eye (0.7 mm×1.3 mm) and human eye (3 mm×6 mm), and implantable electromyogram (EMG) electrode (1.5 mm×10 mm) for targeted muscle reinnervation (TMR) control of prosthetic limbs.

In practice, because the quality of RF powering is very sensitive to the position of the receiver antenna within the RF electromagnetic field, the energy storage component on a chip plays a crucial role in supplying the local power for continuous and reliable operations such as wireless data transmission. Thus, there is a strong need for the development of compact energy storage solutions with appropriate size to meet strict clinical dimension constraints while still providing sufficiently high energy for useful operation.

Unfortunately, current research on integrating miniature energy storage components on a chip is still inadequate. So far, batteries are the primary choice for implantable medical devices. However, as the size of these devices decreases to millimeter scales and beyond, currently available batteries far exceed the available volume for a medical implant. Worse still, despite having a high energy density, batteries suffer from fundamental problems caused by the thermodynamic chemical reactions they are based on: slow charge rate (several hours), limited life time (hundreds to thousands of charge/discharge cycles) and safety concerns associated with using toxic metal materials. The issue of battery replacement after one-to-two-year usage is not only expensive but also involves a potentially high-risk surgery for the patient. Alternatively, clinical size constraints might be met with commercial high-dielectric ceramic surface-mount capacitors with the largest available capacitance. In this case, many capacitors are needed to build power storage units for high energy demands. However, the overall capacitance is still limited, and the 300-μm thickness of commercial capacitors and their rigid mechanical properties make implantable devices unfeasible for many anatomical placements (e.g., the anterior chamber of eye and the nerve interface of muscle). Hence, a tremendous challenge remains in the development of an efficient power supply for wireless miniature implantable devices with high energy density, long life time and mechanical flexibility.

Recently, electrochemical capacitors, also known as supercapacitors, have attracted a great deal of attention. A supercapacitor consists of two electrodes sandwiching a separator immersed in an electrolyte, storing energy based on two mechanisms: electrical double layer capacitance (EDLC, accumulation of ions at the interface between a highly porous electrode and an electrolyte) and pseudo-capacitance (fast and reversible redox reactions at the surface or near-surface of the electrode, providing much higher specific capacitance than EDLC). Compared with conventional physical electrolytic or ceramic capacitors, supercapacitors have a much higher capacitance value in relatively small volumes due to the use of an electrode material with extremely high specific surface area.

Supercapacitors achieve these advantages, however, at the expense of breakdown voltage. Nevertheless stacking devices can alleviate this issue. Stacked supercapacitors can still be smaller and have a significantly greater energy density (e.g., >1 mF/mm$^2$) than conventional capacitors. In addition, supercapacitors do not require a slow charge/discharge process to satisfy the slow thermodynamic chemical reactions in batteries, so they can handle currents that are larger by several orders of magnitude with an efficiency exceeding 90%, and can provide a long life time of up to half a million charge/discharge cycles. The extremely long cycling life of supercapacitors potentially boosts a more-than-10-year operational lifetime before the energy capacity is reduced to 80%, which is a great advantage for implantable medical device applications.

As a consequence, supercapacitors bridge the gap between conventional capacitors and batteries. With the development of low-power circuit technology, researchers have shown great interest in extending the application of supercapacitors to micro-power systems. However, current research efforts on miniature supercapacitors have largely concentrated on the scientific level and on electrode material characterization.

There is a need, therefore, for supercapacitor design as well as implementation methods and arrangements that are suitable for use in implantable medical applications.

SUMMARY OF THE INVENTION

In the present disclosure, a novel power storage and management approach for wireless implantable medical devices is provided. The extremely high specific capacitance of supercapacitors provides devices with more sophisticated capabilities and longer on duty cycles. The solid-state supercapacitors presented are in the form of size-tailorable thin films with the merit of mechanical flexibility. This enables implantation into certain anatomical areas where a rigid device would cause edema (e.g., the eye).

A first embodiment of the invention is an energy storage device that includes first and second electrodes and a solid state electrolyte. The first electrode includes carbon nanotubes, a conductive polymer, and a metallization on said carbon nanotubes. The second electrode similarly includes carbon nanotubes, a conductive polymer, and a metallization on said carbon nanotubes. The solid state electrolyte is disposed at least in part between the first electrode and the second electrode. In at least some embodiments, the conductive polymer of the first electrode includes polyaniline, and the metallization of the first electrode is a gold metallization.

In another embodiment, an energy storage device includes a substrate, first and second electrodes, and a solid state electrolyte. Each of the first electrode and second electrodes include a metallization layer and a layer including a conductive polymer, wherein the first electrode is disposed on the substrate. The solid state electrolyte is disposed at least between and contacting the first electrode and the second electrode.

Yet another embodiment of the invention is a method of fabricating at least a part of an energy storage device that includes a step of providing a first layer of conductive carbon nanostructures, and then applying metal to the first layer of conductive carbon nanostructures. The method also includes providing polyaniline on the first layer of conductive carbon nanostructures and the applied metal to form a first electrode. The method further includes forming a solid state electrolyte on the first electrode.

Another embodiment is a wireless power management arrangement in a receiver for implantable medical devices. The arrangement includes an energy harvesting unit, a first capacitor, a boost converter and a second capacitor. The energy harvesting unit preferably includes an antenna and an RF rectifier, but could alternatively be another device that generates electrical energy wirelessly. The antenna is configured to receive RF energy from a transmitter. The rectifier is coupled to the antenna and configured to rectify the received RF energy. The first capacitor is coupled to the RF rectifier and configured to collect electrical charge associated with the rectified RF energy. The first capacitor is also configured for reversible redox reactions at or near an electrode surface. The boost converter is coupled to the first capacitor configured to boost voltage from the first capacitor. The second capacitor is operably coupled to the boost converter to collect electrical charge based on the boost voltage.

The above described features and advantages, as well as others, will become more readily apparent to those of ordinary skill in the art by reference to the following detailed description and accompanying drawings.

BRIEF DESCRIPTION OF THE DRAWINGS

FIG. 10A shows top plan views of a plurality of embodiments of the energy storage device of FIG. 8C;

FIGS. 10B-10D show various test results of the embodiments of the energy storage device in FIG. 10A;

FIG. 12 shows a detailed process for fabricating the energy storage device of FIG. 8C;

DETAILED DESCRIPTION

Figure 1:
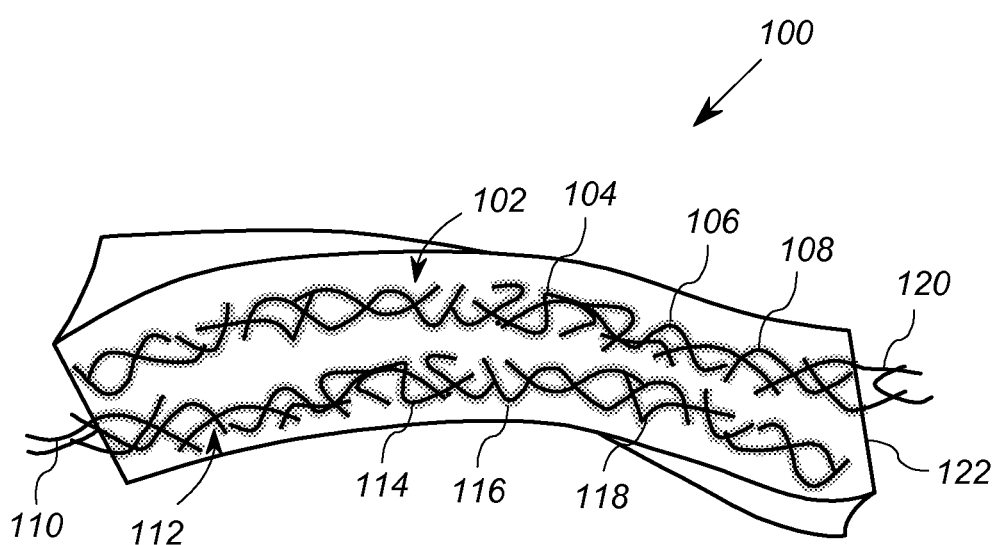
FIG. 1 shows a schematic representative side-cutaway diagram of an exemplary solid state energy storage device according to a first embodiment of the invention.

FIG. 1 shows a schematic representative side-cutaway diagram of an exemplary solid state energy storage device in the form of a capacitor 100 according to a first embodiment of the invention. The capacitor 100 includes a first electrode 102, a second electrode 112, an electrolyte 122. The first electrode 102 comprises carbon nanotubes 104, a conductive polymer 106, a metallization 108, and a first terminal 110. Similarly, the second electrode 112 comprises carbon nanotubes 114, a conductive polymer 116, a metallization 118, and a second terminal 120. The electrolyte 122 is a solid state electrolyte.

In this embodiment, the capacitor 100 is a supercapacitor, meaning that it operates to store energy based on electrical double layer capacitance and pseudo-capacitance (fast and reversible redox reactions at the surface or near surface of the electrodes 102, 112). As discussed above, supercapacitors have a much higher capacitance value than electrolytic or other conventional capacitors due to the use of an electrode material with extremely high specific surface area. In general, the supercapacitor 100 has a power density of approximately between 10 and $10^5$ W/kg and an energy density of $10^{-1}$ to 10 Wh/kg.

The electrolyte, as discussed above, is in a solid state. Prior art conventional supercapacitors use liquid electrolyte, which requires a bulky packaging technique to encapsulate the harmful liquid electrolyte safely. Thus, commercial supercapacitors are usually packaged in the form of a box, cylinder or button, which severely limits the development of much smaller and thinner devices for on-chip applications. In addition, the risk of liquid electrolyte leakage is a key concern for implantable devices. By contrast, solid-state polymer-based electrolytes such as the electrolyte 122 provide many advantages over their liquid counterpart: 1) The use of solid-state electrolytes has no leakage problems since the electrolyte is well dispersed and bounded in the polymer matrix to form a solid-state film. 2) The solid-state electrolytes bind the electrodes and electrolyte into one integrated unit, and in turn allow the device to be fabricated in a more functional manner of thin film with mechanical flexibility. Therefore, the solid-state energy storage device configuration of the capacitor 100 represents a miniature supercapacitor that is suitable for implantable applications.

Figure 2:
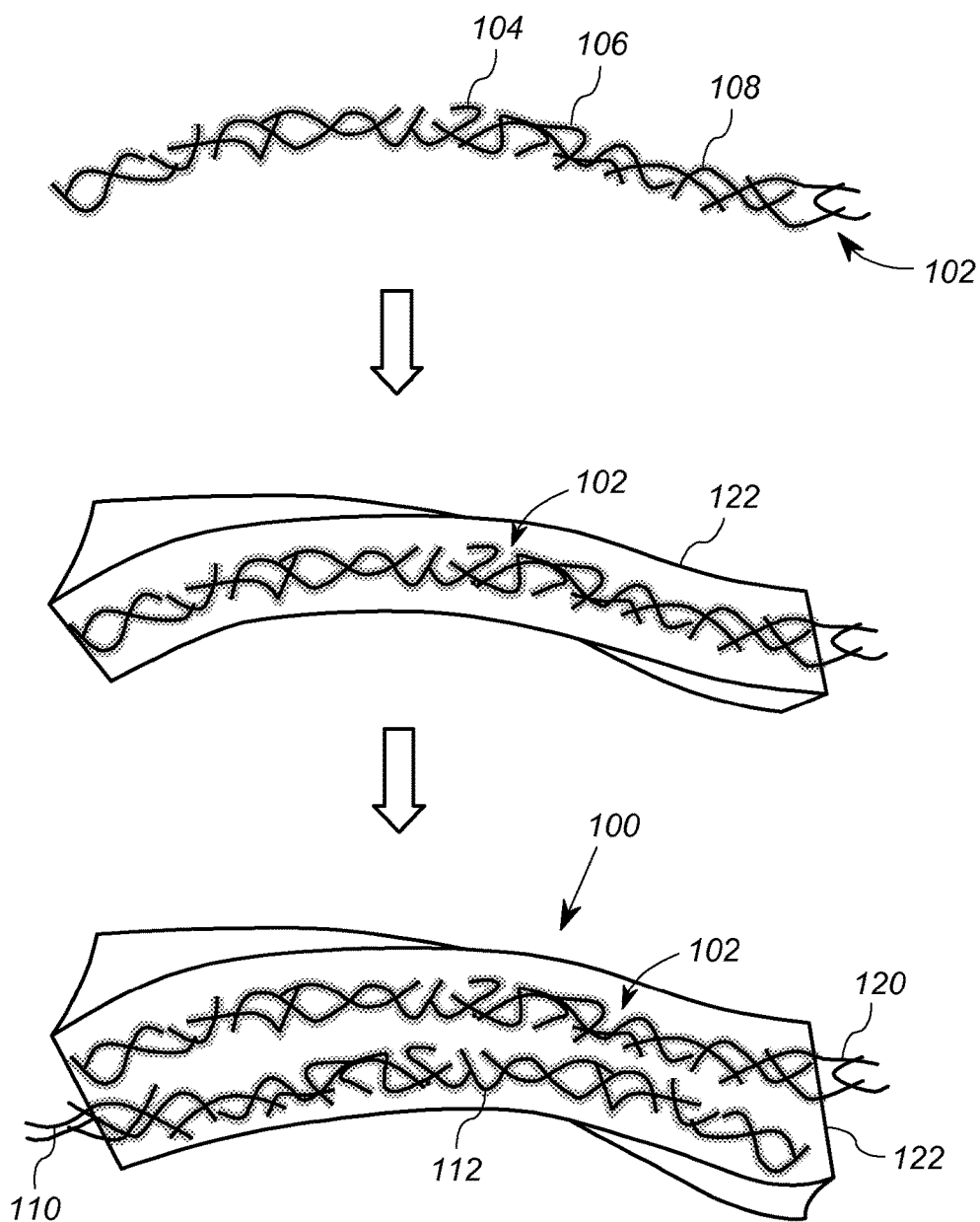
FIG. 2 shows the key fabrication steps of the energy storage device of FIG. 1.

FIG. 2 shows the key fabrication steps of the capacitor 100: first, the electrode 102 is formed. To this end, a 300-nm thickness gold film 108 is deposited on a 30 μm-thick carbon nanotube (CNT) paper 104 to further increase its electrical conductivity, and polyaniline (PANI, or another suitable kind of electrically conducting polymer) 106 is in-situ chemically polymerized on the CNT paper 104 to form a composite electrode containing 40 wt % of CNT and 60 wt % PANI. The highly electrically conductive CNT network 104, 106, 108 serves as the flexible current collector that quickly transports electrons in the electrode 102, and the uniformly coating nanostructured PANI fibers provide an extremely high pseudo-capacitance. Second, an electrolyte solution of 10 wt % $H_2SO_4$ and 10 wt % polyvinyl alcohol (PVA) in deionized water is prepared by mixing the three thoroughly under vigorous stirring at 90° C. for 5 h. Then, two pieces CNT/PANI composite electrodes 102, 112, with matched geometrical size, are immersed in the solution for 30 min and picked out. The liquid electrolyte fills the porous holes inside the electrode and forms a coating layer on the surface. Then the electrodes are left in the fume hood at room temperature for 5 h to evaporate excess water. The electrolyte becomes a solid-state electrolyte 122 with a component ratio of $H_2SO_4$:PVA:$H_2O$=45:45:10. Third, the two electrodes 102, 112 coated with solid-state electrolyte 122 are tightly pressed together into one integrated unit 100, by sandwiching a thin layer of viscous electrolyte between them as an adhesive. The solid-state electrolyte layer 122 between the two electrodes 102, 112 also serves as a separator preventing the two from shorting.

Samples of the solid-state thin-film supercapacitors 100 for various miniature implantable medical devices include one having dimensions of ~3 mm×5 mm for the human-eye TOP sensor, one having dimensions of ~1 mm×10 mm for the implantable EMG electrodes for TMR control of prosthetic limbs, and one having dimensions of ~1 mm×2 mm for the mouse-eye TOP sensor. The typical thickness of the entire device 100 is ~100 μm, measured by a digital micrometer and also probed by the scanning electron microscope (SEM) picture, which is comparable to that of a piece of commercial print paper. Moreover, in the sandwich-like electrode/separator/electrode configuration of FIG. 1, the excellent bonding of the solid-state polymer-based electrolyte 122 with the paper-like composite electrodes 102, 112 provides the device 100 with the merit of mechanical flexibility. The supercapacitor 100 can be rolled up, bent or twisted easily, and even folded without any cracking. It can be tailored into any shape down to 1 mm², which is beneficial for applications to meet the various size requirements for miniature implantable devices.

Figure 3A:
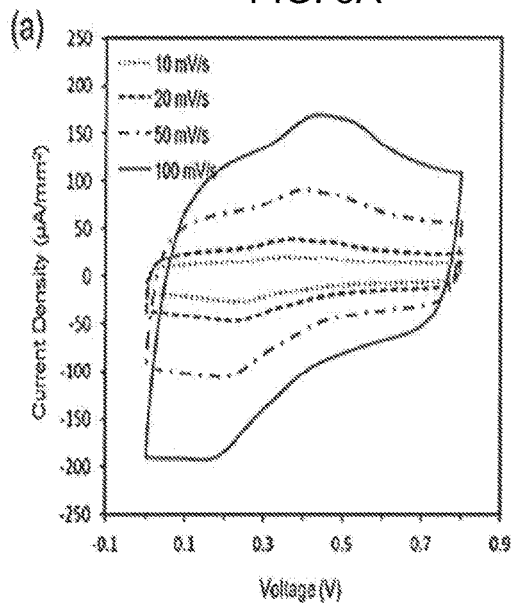
FIGS. 3A-3D show various response curves of a sample of the energy storage device of FIG. 1.

The electrochemical performance of a sample of the supercapacitor 100 was thoroughly evaluated using the GAMRY Reference 600™ Potentiostats controlled by a computer. All tests presented here are performed on the 3 mm×5 mm-sized supercapacitor 100, and specific performance parameters per area are calculated and found to be consistent with tests on other form-factors. The capacitance behavior is first examined by a cyclic voltammetry (CV) test at various scan rates of 10, 20, 50, and 100 mV/s from 0 to 0.8 V. The breakdown voltage of 0.8 V is determined by the intrinsic electrochemical property of PANI. Voltages higher than 0.8 V would make the redox electrochemical reactions of PANI nonreversible and in turn damage the device. Referring to FIG. 3A, CV curves showed a well-defined rectangle-like shape with visible redox peaks. These show the capacitance behavior with the presence of the PANI's pseudo-capacitance. Accurate capacitance values and other specific parameters such as ESR, energy and power are obtained through the galvanostatic charge/discharge measurements under different current loads, where the working condition of the supercapacitor is more like that in a practical application.

Figure 3B:
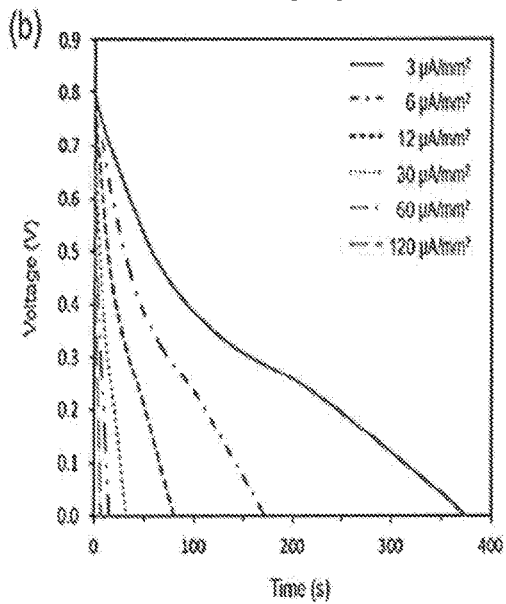
Figure 3C:
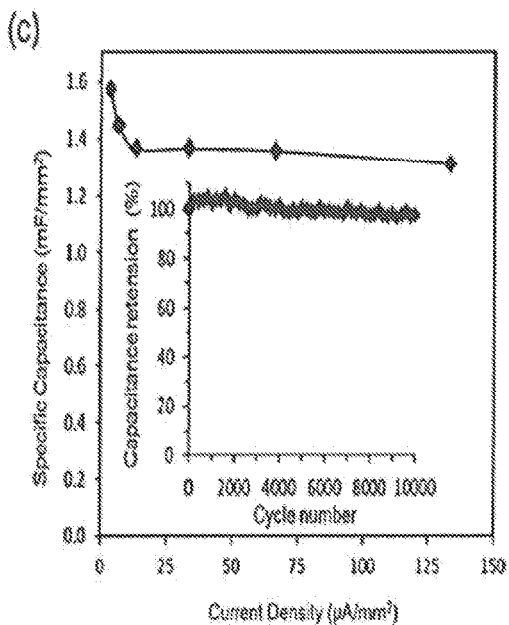

FIG. 3B shows the discharge profiles at current densities from 3 to 120 μA/mm² after the device is fully charged. The corresponding capacitance values vs. current loads from the discharge curves are summarized in FIG. 3C, where the capacitance (C) of the supercapacitor is given in (1).

$$C = \frac{Q}{V} = \frac{1 - t_d}{V} \tag{1}$$

where Q is the total amount of the charge extracted from the device, which can be determined by the product of the discharge current (I) and the time of discharge ($t_d$), and V is the potential difference applied across the two electrodes during the whole discharge process. Based on (1), the area capacitance of the supercapacitor is 1.57 mF/mm² at a low current density of 3 A/mm². The supercapacitor yields an excellent capacity rating performance with only 15% capacitance loss when the current load is increased by a factor of 40 (1.57 mF/mm² at 3 μA/mm² decreased to a stable value of 1.31 mF/mm² at 120 μA/mm²). The cycling charge/discharge test at a large current density of −120~1 A/n11n2 (a high current density of 20 A/g based on the CNT/PANI composite electrode mass) is also evaluated with each cycle of 100%–depth discharge. The inset of FIG. 3C indicates that the supercapacitor exhibits outstanding cycling stability, which is another key requirement for developing long lifetime-of-operation devices. Electrically conducting polymer electrodes often suffer from limited cycle-ability, owing to swelling and shrinking of the active polymer structure caused by the doping/de-doping of ions into/out of the polymer chains during its charging/discharging process. The cycling performance of the 3D nanostructured CNT network coated with PANT electrodes 102, 112 shows an excellent capacitance retention as high as ~94% over 10,000 cycles, which is far superior to the PANI-based supercapacitors reported in previous literature (typically 60% to 85% retention for over 1000 cycles). The unique advantage of the highly porous CNT network 104 can serve as a mechanical framework for PANI 106 and accommodate the swelling and shrinking of the polymer chain during an intensive cycling process.

The ESR of a supercapacitor under a specific current load is estimated using (2).

$$R = \frac{\Delta V}{2I} \tag{2}$$

where ΔV is the initial drop in voltage upon switching from charge to discharge and the factor 2 attributes to the reverse of voltage on the ESR during the current switching. The energy (E) and maximum power (P) of the supercapacitor can be calculated using (3) and (4), respectively.

$$E = \frac{1}{2} C \cdot V^2 \quad (3)$$

$$P = \frac{V^2}{4R} \quad (4)$$

Figure 3D:
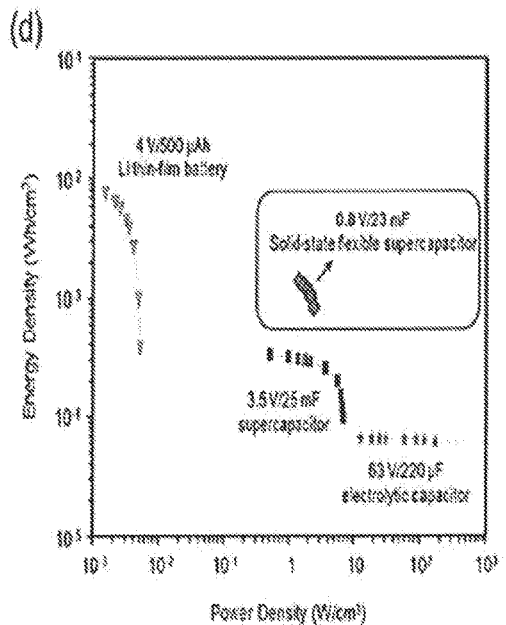

Using the energy and power data at various current loads, we can put the device in Ragone Plot (FIG. 3D), which compares the sample supercapacitor 100 with various commercially available energy storage devices for high-power microelectronics (considering the volume of the entire device including electrode material, electrolyte, separator and packaging). Within the testing current load range, the sample supercapacitor 100 exhibits an energy density of up to 1.37 mW/cm$^3$, a value that is approximately two times higher than that of the conventional bulky 25 mF commercial supercapacitor. The supercapacitor 100 can deliver a power density of 2.4 W/cm$^3$, which is three-orders of magnitude higher than that of the 500-µAh thin-film lithium batteries.

Compared with the conventional capacitor with the largest available capacitance, the supercapacitor 100 has a much higher specific capacitance of 1.3 mF/mm$^2$ with a smaller thickness of ~100 µm, which provides a promising way to meet high energy demand. In practice, several tens of single conventional capacitors would be needed to be surface-mounted on a chip to obtain an overall high capacitance, which is a difficult and complicated process that suffers from low yield. In comparison, the miniature supercapacitor 100 can be custom-made with a tailorable shape down to 1 mm$^2$ to meet various size constraints. In addition, it has the merit of mechanical flexibility, which makes it feasible to extend its practical application for miniature flexible implantable medical devices (e.g., IOP sensors in the anterior chamber of eyes and EMG electrodes at the nerve interface of muscles).

Based on the performance of the supercapacitor 100, it can be implemented as the local power supply for several miniature wireless implantable medical devices. The primary advantages of this supercapacitive system include the potential for a vast increase in device functionality and the ability to operate for an extended period of time when the continuous nearby external wireless powering source is temporarily absent. The full system presented in the present disclosure is a wirelessly-powered active system with wireless-data-transmission functionality among others.

Figure 4:
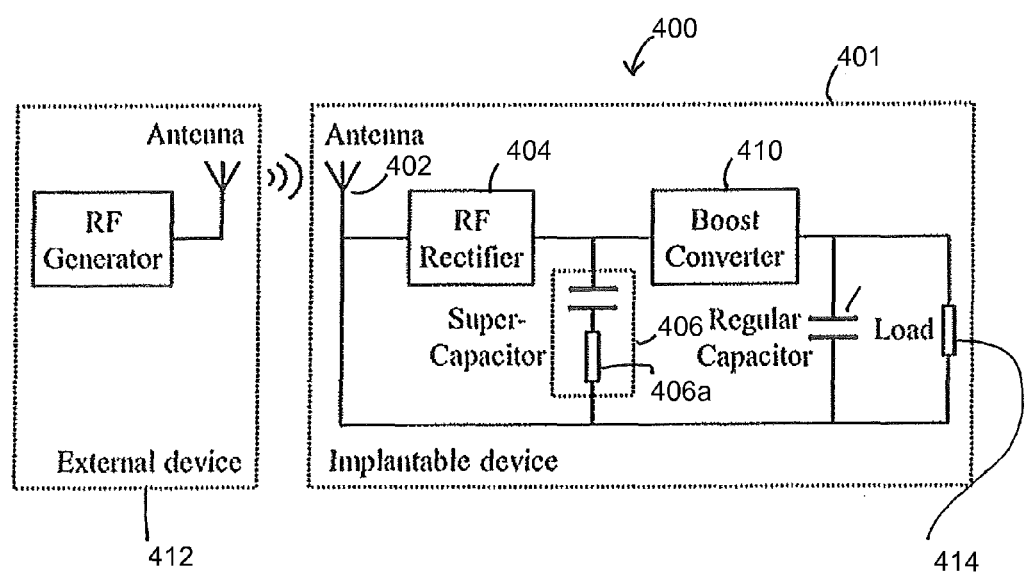
FIG. 4 shows a simplified schematic diagram of an exemplary power management arrangement for an implantable device using the energy storage device of FIG. 1 as part of a local power supply.

Implementation of the capacitor 100 in an implantable device can be achieved with a power management arrangement or system 400 shown in FIG. 4. In particular, FIG. 4 shows a simplified schematic diagram of the power management system 400 with the supercapacitor 100 of FIG. 1 as part of a local power supply.

In general, the wireless power management arrangement 400 is a receiver for an implantable medical device package 401. The arrangement 400 includes an energy harvesting apparatus to include thermal, mechanical, and electromagnetic harvesting that generates electrical energy, as well as a first capacitor 406, a second capacitor 408 and a boost converter 410. The energy harvesting apparatus harvests energy wirelessly received, or in other words, without being connected or wired to an electrical power source. In this embodiment, the energy harvesting apparatus includes an antenna 402, a rectifier 404, a first capacitor 406, a second capacitor 408 and a boost converter 410. The arrangement 400 is configured for use with an external transmitter 412. The antenna 402 is configured to receive RF energy from a transmitter 412. The rectifier 404 is coupled to the antenna 402 and is configured to rectify the received RF energy. The first capacitor 406 is coupled to the RF rectifier 404 and configured to collect electrical charge associated with the rectified RF energy. The first capacitor 406 is a supercapacitor, and thus is configured for reversible redox reactions at or near an electrode surface. The first capacitor 406 may suitably be the capacitor 100 discussed above in connection with FIG. 1. However, the first capacitor 406 may also be another type of supercapacitor, including but not limited to the supercapacitors described herein.

For reasons discussed further below, the boost converter 410 is coupled to the first capacitor 406 configured to boost voltage from the first capacitor 406. The second capacitor 408 is operably coupled to the boost converter 410 to collect electrical charge based on the boost voltage. The boost converter 410 can then power the load 414, which may suitably be sensor circuitry, processing circuitry, and the like, of an implantable medical sensor device In operation, the antenna 402 receives an electromagnetic wave generated by an external RF power source or transmitter 412, which includes an RF generator 416 and an antenna 418. The RF rectifier 404 converts the received RF energy signal from the antenna 402 into DC current. The generated DC current recharges the supercapacitor 406. The supercapacitor 406 then powers functional components (load 414) in the implantable device 401 such as: microelectromechanical systems (MEMS) actuators, application specific integrated circuits (ASICs), and memory. The high capacitance of the supercapacitor 406 enables functional operation in the absence of continuous RF powering. The time available depends on the power consumption of the full system 400 and the available volume for the supercapacitor 406 within the implant package 401.

As discussed above, to realize the super-capacitive power supply for wireless implantable medical devices, two challenges exist due to the physical limitation of supercapacitors: a high equivalent series resistance (ESR) 406a, and a low breakdown voltage. In principle, the larger the capacitance is, the slower the device works and lower the power level is. Thus, the supercapacitor 406 has a relatively large ESR 406a. As a result, when the load 414 draws a large (mA-range) current pulses (e.g., during data transmission or stimulation), it can result in significant severe internal voltage drop through the ESR 406a if components were to draw their currents directly from the supercapacitor 406. Such a drop would lead to an inability to run the load 414 with the necessary output voltage. At the same time, supercapacitors are limited by their low voltage ratings. A single supercapacitor could not sustain a high enough YDD to power analog components such as a neural stimulator or transmitter. Combining capacitors in series is a simple but imperfect way to increase the rated voltage.

Thus, the embodiment of FIG. 4 helps increase the supercapacitors' utility by providing the boost converter 410 and second capacitor 408. The second capacitor 408 is configured to optimize effective series resistance (ESR) over capacitive density, thus overcoming the shortcoming of the supercapacitor. For wireless data transmission applications, the second capacitor 408 is preferably a conventional capacitor having a low ESR (lower than the supercapacitor 406) in parallel with the supercapacitor 406, wherein the supercapacitor 406 has a high energy density. This results in an efficient hybrid powering system that can meet varying device power requirements: the supercapacitor 406 as the primary high-energy source charges the second, regular capacitor 408 during the sleep mode of the load 414 while the regular capacitor 408 as the primary high-power source delivers the pulse current to the load 414 during the active mode. As a result, under the same size constraint, the overall energy of the system could be remarkably increased while enabling wireless telemetry and other high current draw functionalities. The boost converter circuit 410 is provided to increase the voltage of a single supercapacitor 406 to a higher value, which is enough to run all the circuits and electronic components on the chip from the regular capacitor 408. If multiple supercapacitors 406 are used, the boost circuit 410 may not be necessary.

This novel approach to enable the super-capacitive power supply system for wireless implantable medical devices creates a solution for a broad range of devices, where high power and energy are simultaneously required with limited room designed for energy storage units.

The operation and structure of an exemplary embodiment of the power arrangement 400 is now discussed in further detail. Wireless RF charging of the supercapacitor 406 is performed using a high-frequency wave that feeds the RF rectifier circuit 404 through the antenna 402, which is a loop antenna. Such techniques are known. The RF powering operates at a frequency of 3.6 GHz, which is a "lightly-licensed" band for unrestricted protocols commonly used for WiMAX and WiFi applications, and is sufficiently removed from the 2.4-GHz telemetry band to isolate the RF powering and the telemetry path.

The RF rectifier circuit 404 in this embodiment may suitably comprise a Cockcroft-Walton multiplier, also referred to as the Greinacher multiplier. The multiplier provides sufficiently high voltages with relatively low input power levels in comparison to various other structures including the PMOS voltage multiplier, full-wave diode rectifier, and gate cross-connected bridge rectifier. The RF rectifier circuit 404 further comprises Schottky diodes, which are used due to their high-frequency performance and low forward-bias voltage (150 to 300 mV), which allows for rectification at lower input biases for low-power operation.

The boost converter 410 operates as part of the power management in the arrangement 400. In particular, to enable the supercapacitor 100/406 to run the load circuits 414, a power management circuitry is necessary for two reasons. First, the breakdown voltage of the supercapacitor 100/406 in the example given in FIGS. 1-3 is limited to 0.8 V, which would not sustain a high enough bias voltage to power analog components such as a neural amplifier or transmitter of the load 414. Second, the load current of the super-capacitive system is limited by the ESR 406a of the super-capacitor 100/406, despite that supercapacitors are effective at providing extremely high energy storage. Typically, the powering system must support a standby load and high current burst load during one transmit operation. Since it is required to use a step-up circuit to raise the system's bias DC voltage ("VDD"), the current drawn from the input is larger than the load current, thus the loss through the ESR 406a can severely limit the amount of current that the super-capacitive system can support. In order to overcome the aforementioned limitations, the step-up converter 410 is designed in conjunction with the traditional (non-supercapacitor) capacitor 408 to sustain the burst current for one transmission operation. For the purposes of demonstrating the super-capacitive system, it is assumed that the maximum DC voltage drop allowed to sustain functionality in the implantable device is 0.2 V (from a VDD of 1.8V). That allows ASIC components (load 414) to be subjected to an 11 percent sag in VDD. Typically, corner simulations would account for such a sag in VDD to guarantee functionality at the minimal voltage. In addition, the transmission time for one bit to be successfully decoded is at most 2 μs with a maximal current of 1 mA. The output capacitance size needed is determined from these numbers using the fundamental relationship for current through a capacitor to be 10 nF.

In an alternative to the boost converter 410, the voltage may be boosted by a simple charge pump, which is a common method of voltage step-up due to its ability to be realized fully on a chip without an external inductor. However, as the voltage gain ratio increases, the threshold voltage of the MOSFET increased due to the body effect. This results in increased losses at each stage and a decrease in the system's overall efficiency. Furthermore, the rate of VDD scaling in shrinking CMOS process nodes is faster than the rate of threshold voltage scaling. Therefore, as technology scales down, the efficiency of charge pumps will continue to decline.

Due to these limitations, it is preferable that the boost converter 410 be an inductive based converter of a conventional design in many power electronics applications. Like the charge pump, efficiency suffers at low input voltages. In order to maximize efficiency, it is important to use clock sources as ideal as possible, to prevent switching losses, and to use available devices that have the minimum conduction losses. It will be appreciated that the second capacitor 408 operates to some degree as the output capacitor of the boost converter.

Figure 5:
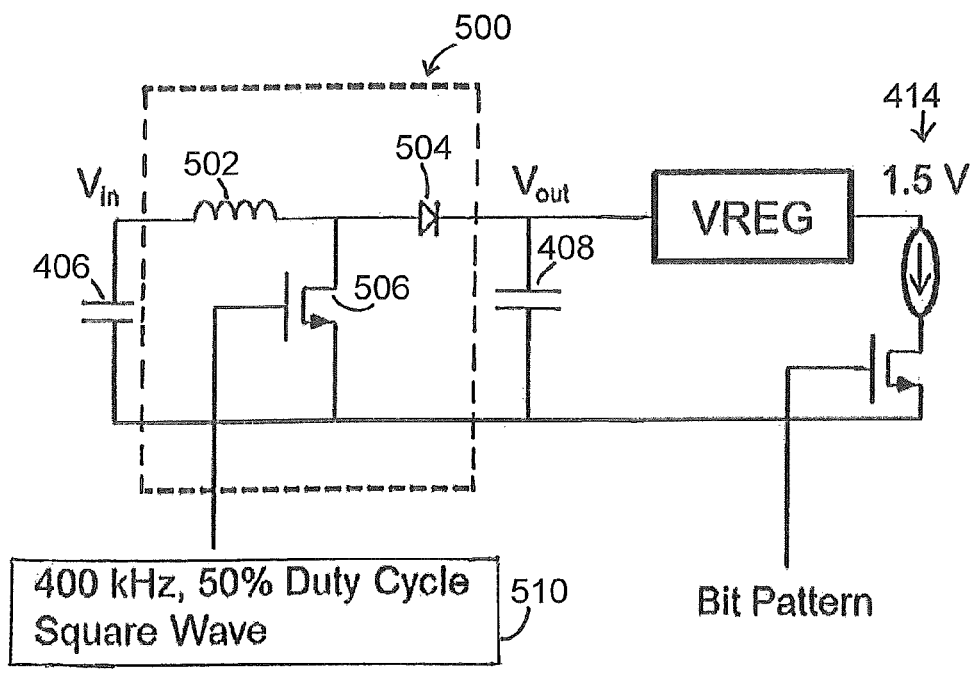
FIG. 5 shows a schematic diagram of an exemplary boost converter circuit of the power management arrangement of FIG. 4.

FIG. 5 shows a schematic diagram of a boost converter circuit 500 that may be used as the boost converter 410 of FIG. 4, in context with the supercapacitor 406, the second capacitor 408 and the load 414. The boost converter circuit 500 includes an inductor 502 and a diode 504 coupled in series between the two capacitors 406, 408, and a switching MOSFET 506. The MOSFET 506 has a drain coupled to a node between the inductor 502 and the diode 504 and a source coupled to ground. The MOSFET 506 also has a gate coupled to a drive signal source 510. During the switch-on state, current flows from the supercapacitor 406 to charge the inductor 502. The output stage remains disconnected since the diode 504 is reverse-biased. When the switch 506 turns off, the current stored in the inductor 502 cannot change instantaneously. Therefore, a large voltage spike appears at the drain of the MOSFET 506. These spikes are captured by the output capacitor 408, which controls the ripple of the DC output.

The boost converter 410 also includes elements to carry out output regulation, not shown. For example, to regulate the output feedback in a boost converter, it is typical to use current-mode control. This strategy is often preferred over voltage-mode control due to better stability and faster dynamic response. For the purposes of demonstrating the effectiveness of this super-capacitive powering system, we use our linear voltage regulator (540 μm×350 μm) fabricated in the TI 130 nm process to fix the output voltage.

Experimental Demonstration

An experimental demonstration of the fully working sample of the system 401 is discussed below. The system 401 included the charging of the supercapacitor 100/406 with wireless RF powering, and operation of the wireless implantable medical device 401 was based on the super-capacitive power supply 400 shown in FIG. 4, when wireless RF powering is absent. The supercapacitor 100 was connected to the boost converter 410 based power management board with a resistance load of 1 MΩ, which is representative of the standby load presented by typical implantable devices.

The RF signal generator and the power amplifier (transmitter 412) sent out the desired RF waves through a horn, patch, or other antenna. To get maximum power coupling, the receiver antenna 402 was placed in the center of the beam produced by the transmit antenna. The antenna 402 coupled the incoming RF signal into the rectifier 404, which then converted it to DC current. The DC current directly charged the supercapacitor 100/406. In this example, a 3 mm×5 mm-sized supercapacitor 406 (to fit the dimensions of a human TOP package) was used for the RF powering characterization and was attached on a hard plastic substrate with silver epoxy glued on either electrode to make a reliable electrical connection with the external circuit.

Figure 6:
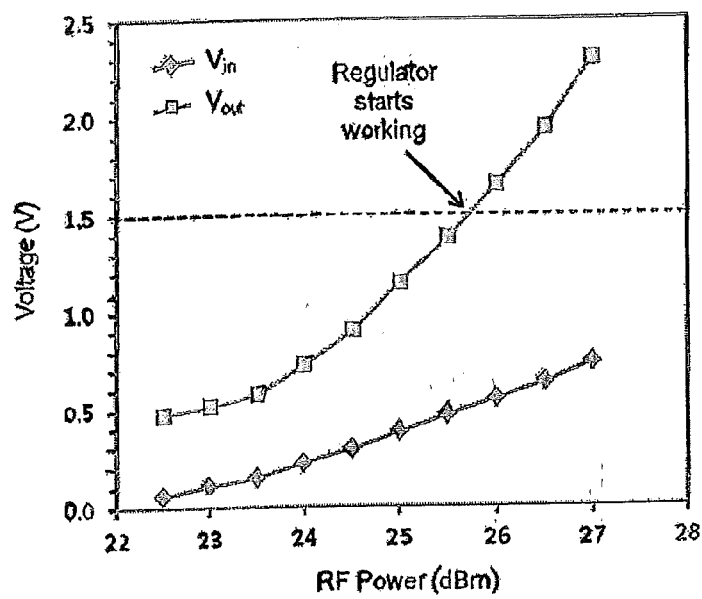
FIG. 6 shows a graph of the relationship between input RF power and voltages in the capacitors of the power management arrangement of FIG. 4.

FIG. 6 shows a graph of the relationship between input RF power provided by the transmitter 412 and voltage $V_{in}$ into the supercapacitor 406 and the voltage $V_{out}$ of the second capacitor 408. As expected, as the RF signal amplitude (input power) increased, the maximum voltage of the supercapacitor 100/406 when fully charged correspondingly increased, as illustrated by $V_{in}$, in FIG. 6. At an input power of ~27 dBm, the voltage of the supercapacitor 100/406 was able to be fully charged to 0.8 V after a continuous charging time of 8 min, while the corresponding charging current gradually drops from 253 to 7.3 µA. Compared with batteries, supercapacitors can experience a much wider range of recharging patterns. The maximum charging current of 253 µA is far less than the value the supercapacitor 100/406 can handle (up to 1.8 mA), so increasing the input power could lead to a much faster charging time. A 0.8 V voltage regulator was needed in the circuit feeding the supercapacitor 100/406 to prevent over charging of the supercapacitor 100/406.

The performance of the boost converter 410 while wirelessly charging the supercapacitor 100/406 can be characterized as follows. As the RF powering level increases, the input and output voltages $V_{out}$ of the boost converter increase, as shown in FIG. 6. At an input power of 26 dBm, the output of the boost converter reached the voltage of 1.5 V (the corresponding input voltage was 0.5 V), which made the voltage regulator start to turn on. Thus between the discharge voltage window of 0.8 to 0.5 V, the supercapacitor could stably run the circuit load with the voltage regulator on. When the voltage of the supercapacitor dropped below 0.5 V, external RF power was needed to recharge it.

Figure 7A:
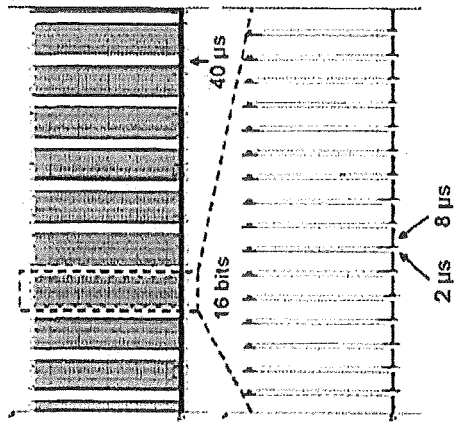
FIGS. 7A-7B show simulations of load circuit data transmission the relationship to output voltages of the energy management circuit of FIG. 4 over time.
Figure 7A:
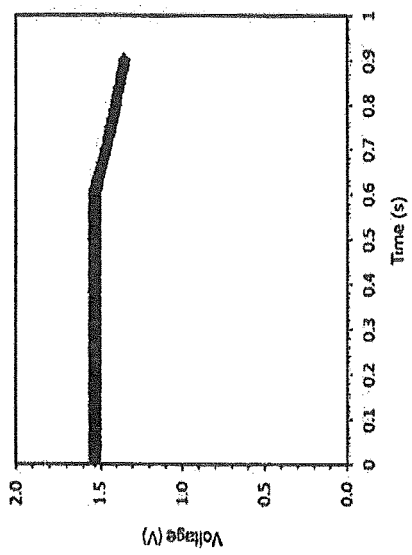

After the supercapacitor 100/406 was fully charged, the external RF powering source was removed, and the performance of the super-capacitive power supply 400 was measured while powering the implantable devices 414 during telemetry. In this power management design, the implantable device 414 were expected to present a load to the power management circuit 400 that varied between a standby current, based on present ASIC design conditions, and a peak current of up to 1 mA that occurs during each transmit cycle. Also, the worst case power consumption of the voltage regulator was 40 µA, which served as a reasonable approximation for standby current consumption based on present design conditions. Using a worst case on/off keying (OOK) modulation scheme where all transmitted bits are logic '1', or an FSK modulation scheme, a 1 mA consumption was consumed during transmission of each bit. The highest data rate for the load devices 414 corresponded to that of EMG electrodes for TMR control of prosthetic limbs. Here sampling was done at 5 kHz, and then 16 bits per sample were transmitted. Each bit had an on time of 2 µs followed by 8 µs of off time (FIG. 7A left). After the sample was taken, the system 401 waited for 40 µs, allowing RF powering if available to recharge the supercapacitor 100/406. The inductor 502 used in the boost converter 410 was a 100 µH, 0603 component, which measures 1.6 mm×0.8 mm×0.8 mm. The size of the supercapacitor 100/406 was ~1 mm×10 mm, measuring ~13 mF. These dimensions should be small enough to be integrated in the packaging of the final-version of implantable EMO-electrode devices. As FIG. 7B right shows, the output voltage was regulated stably at 1.5 V for about 650 ms, and dropped below 1.35 V after 900 ms (usually voltage that is 10% below 1.5 V does not make the device work). Herein, the power consumption of the EMG electrodes for TMR control of prosthetic limbs was very high because the EMG signal was required to be detected frequently in order to guarantee continuous robotic arm movements.

Figure 7B:
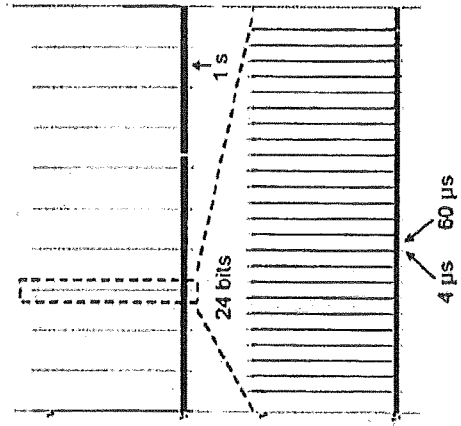
Figure 7B:
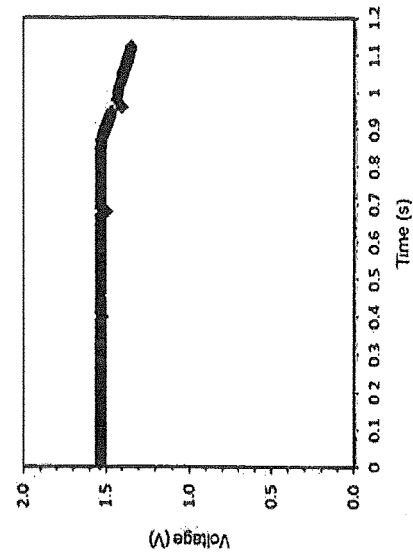

In addition, the same system was demonstrated using a bit pattern designed for mouse IOP measurement as the load 414. The TMR (as load 414) example shows the worst case from a power consumption standpoint, while the mouse TOP sensor (as load 414) shows the worst case from a size standpoint. In the mouse TOP application, 24 bits of data were sampled at a slow frequency of 1 Hz, which is due to the slow-varying pressure changes in the mouse eye over time. When sampling, each bit had a transmit time of 4 µs, followed by 60 µs of off time, and the rest time is set to is between each sample (FIG. 7B left). As with the EMG-electrode experiment, each bit transmitted was at logic '1', resulting in worst case power consumption for OOK. The supercapacitor 100/406 was ~1 mm×2 mm, measuring ~3 mF. The supercapacitor 100/406 performance when using this modified bit pattern can be seen in the discharge plot of FIG. 7C right. A continuous and stable output voltage after the VREG is measured for a period of 1.12 s when the RF powering input is absent.

Thus, the supercapacitor 100/406 as a high-energy local power supply provided resilience for the full system in the case of intermittent outages in RF powering by adding a short storage time. There is a balance between the extended operation time when RF powering is absent and the power consumption level of the functional circuit.

To enable supercapacitors as local high-energy power supplies for miniature wireless implantable medical devices, the present disclosure presents the fabrication of the novel millimeter-sized flexible and solid-state thin-film supercapacitors 100 and a power management circuit 400 designed to overcome the physical limitations of the supercapacitor 100 for implantable devices with high peak current draws (e.g., from telemetry or stimulation). The novel supercapacitor presented has an extremely high area capacitance of 1.3 mF/mm$^2$ and excellent long cycling stability of less than 6% capacitance loss after 10 000 charge/discharge cycles. In the super-capacitive system, a conventional capacitor is paralleled with the supercapacitor as an intermediate power source for high-current draws, and a boost converter is used to boost the breakdown voltage higher than 1.5 for functional operation. A fully working system was experimentally demonstrated. This included the charging of the supercapacitor with wireless RF powering and the data-transmission operation of the device based on the supercapacitor for an extended period of ~1 s when RF powering was absent. Future research will be focused on achieving longer operation time through the following pursuits: first, increasing the overall capacitance within the size constraint by achieving multiple-layer supercapacitors in parallel, second, increase the efficiency of the power management circuits through circuit optimization, and lastly to reduce the overall power consumption of the device by upgrading the ASICs themselves.

As discussed above the supercapacitor 406 may take other forms. FIG. 8C shows a side cutaway schematic view of a supercapacitor 800 according to another embodiment of the invention that may be used as the supercapacitor 406 in FIG. 4, as well as in other implementations. In particular, FIG. 8C shows an energy storage device 800 that includes a substrate 802, a first electrode 804, a second electrode 806, and a solid state electrolyte 808. The first electrode 804 includes a layer including a conductive polymer 810 and a metallization layer 812. The first electrode 804 is disposed on the substrate 802. The second electrode 806 includes a layer including a conductive polymer 814 and a metallization layer 816, and is disposed on the substrate 802. The solid state electrolyte 808 is disposed at least between and contacting the first electrode 804 and the second electrode 806.

In this embodiment, the substrate 802 is a flexible substrate, preferably formed from at least one of the group consisting of parylene and liquid crystal polymer. As shown in FIG. 8C, the solid state electrolyte 808 covers the first electrode 804 and the second electrode 806, and such that the solid state electrolyte 808 and the substrate 802 substantially encapsulate the first electrode 804 and the second electrode 806, with the exception of contacts of metallizations 812 and 816, the extend through vias 820, 822 in the substrate 802, to provide backside contact pads 824, 826.

In another embodiment, the substrate 802 comprises a rigid mechanical load bearing element of a prosthetic device, not shown, but which would be known in the art. In other embodiments, the flexible substrate 802 may be constructed of poly methyl methacrylate or hydrogels.

The conductive polymers 810 and 814 in one embodiment are formed from polyaniline, or PANI. In some embodiments, the conductive polymer layers 810 and 814 further comprise a combination of carbon nanostructures such as carbon nanotubes and PANI, prepared in manner similar that described above in connection with FIGS. 1 and 2. The solid state electrolyte 808 is formed at least in part from polyvinyl alcohol.

The embodiments of the device 800 having a flexible substrate provide a compact flexible and all-solid-state microsupercapacitor with electrical contact pads on the back side formed from the metallizations 812 and 816. This device 800 is efficient by utilizing room on both sides of the substrate 802, and in turn enhances the practical energy storage capacity of the whole device, The entire device has a tiny footprint of 720 μm×720 μm, consisting of all the device components including two supercapacitive polyaniline (PANI) electrodes 804, 806, a solid-state H2SO4-PVA electrolyte packaging 808 and two backside gold (or gold/titanium) electrical contact pads 824, 826. The compact micro-supercapacitor 800 presented is at much smaller size scales than previously achieved acquires a large specific areal capacitance, good rate capability and excellent charge/discharge cycle life. Additionally, the specific capacitance can be well controlled by modifying the parameters during the PANI electro-deposition process. Moreover, smaller micro-supercapacitors can be obtained by easily cutting the original device into smaller segments. Finally, compact micro-supercapacitor modules made of four single devices in series or in parallel are achieved, by surface-mounting single devices as closely as possible on a flexible patterned circuitry substrate, indicating that the compact micro-supercapacitor is product-like and ready for practical on-chip applications to meet various power and energy requirements.

Figure 8A:
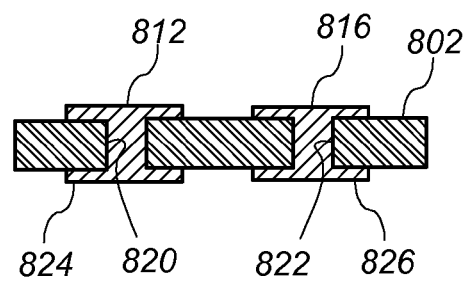
FIGS. 8A-8C show a simplified process for generating a second exemplary energy storage device according to the invention, and the second exemplary energy storage device.
Figure 8B:
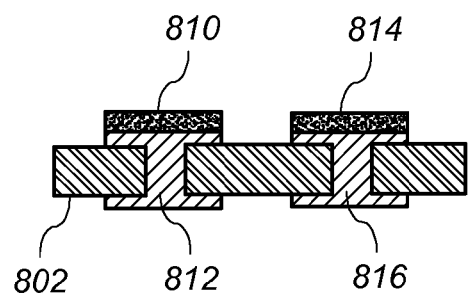
Figure 8C:
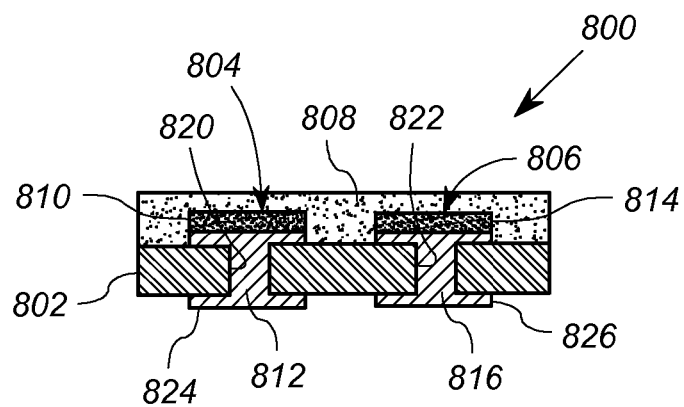

FIGS. 8A to 8C show simplified schematic illustration of the three key fabrication steps of the compact supercapacitor 800 of FIG. 8C. The supercapacitor 800 employs a planar two-electrode configuration (804, 806) to form a single micro-supercapacitor device. A liquid crystal polymer (LCP) sheet (UL TLARAM 3850, Rogers Co.) is used as a soft and flexible host substrate 802, because of its chemical inertness, mechanical properties and ability to be micro-machined. The substrate 802 includes the vias 820 and 822, and the metallizations 812 and 814 extend through each, forming a base of the electrodes 804, 806, and the back-side contact. (See FIG. 8A). The metallizations 812 in this embodiment are gold.

As shown in FIG. 8B, two 720 μm×310 μm-sized pseudocapacitive PANI electrodes 810, 812 are grown on gold current collectors 812, 814, with a 100-μm spacing. Thereafter, the PANI electrodes 810, 812 are coated by a solid-state H2SO4-PYA electrolyte layer 808 as shown in FIG. 8C.

As a result, on the back side of LCP, two 720 μm×310 μm-sized gold electrical contact pads are aligned and connected to the corresponding topside electrodes through gold deposition in the sidewall of the 100-μm-wide through-LCP via holes 820, 822. The device configuration design presented sufficiently utilizes available space on both sides of the substrate, to yield a compact energy storage device. In addition, the simple rectangular-shape electrode design facilitates the cutting of an original device into smaller ones, which will be discussed later in detail. The fabrication strategy combines three state-of-the art techniques: the "top-down" micro-fabrication of topside current collectors, backside electrical contact pads, and through-LCP via-hole connection between the two; "bottom-up" electrochemical polymerization of nanostructured PANI as supercapacitive electrodes 810, 814; formation of the all-solid-state device using H2SO4-PYA polymer electrolyte 808. In brief: first, patterned through-LCP via holes 820, 822 were obtained by an oxygen plasma deep-etching process (Plasma-Tech RIE), followed by a Ti/Au (50 nm/500 nm) deposition and patterning on either surface of LCP for the topside current collectors 812, 816 and backside electrical contact pads 824, 826, respectively. Herein, a metal sputtering system (MANTIS Deposition Ltd.) was used for metallization to secure the through-via metal interconnect, taking advantage of the good step-coverage of sputtering.

Second, a flexible LCP was bonded on a Si wafer, not shown, using a thin photoresist layer (PR, AZ1518, 4 μm) as an adhesive, with the backside facing toward the Si wafer to seal the electrical contact pads. Then, PANI was electrochemically deposited in a typical three-electrode setup, with the patterned current collectors 812, 816 as the working electrode, a platinum mash as the counter electrode, and an Ag/AgCl electrode as the reference electrode. To grow PANI with excellent nanostructures, cyclic voltammetry (CV) at a scan rate of 100 mV/s between a potential window of 0 to 0.85 V (vs. Ag/AgCl) was carried out in an electrolyte solution of 0.1 M aniline monomer in 0.5 M $H_2SO_4$ at room temperature (GAMRY Reference 600™ Potentiostats). The number of CV cycles was well controlled to obtain desired amount of PANI. Third, a $H_2SO_4$-PVA (PVA=polyvinyl alcohol) polymer electrolyte 808 was coated onto the surface of the two PANI electrodes 810, 814 to form the supercapacitor 800. After the Si wafer releasing and the device outline cutting, a single micro-supercapacitor device 800 with backside electrical contact pads 824, 826 was obtained.

The micro-fabrication mask was designed with a patterned array that can yield multiple single micro-supercapacitors through one fabrication process, which shows the potential of the technique presented to be industrialized. A flexible composite sheet with 30 single micro-supercapacitor devices embedded therein can be produced.

Experimental Evaluation

We first evaluate the energy storage performances of a single micro-supercapacitor 800 using a combination of cyclic voltammetry (CV) and galvanostatic charge-discharge measurements at room temperature. To test such small energy storage devices 800, we utilize a pair of microprobes (DCM 205 Series Precision Positioner at RF-I Microwave Probe Station, CASCADE MICROTECH™, USA) to connect the backside electrical contact pads 824, 826 of the device with the electrochemical station. In this evaluation, multiple embodiments of the supercapacitors 8000 were evaluated.

Figure 9A:
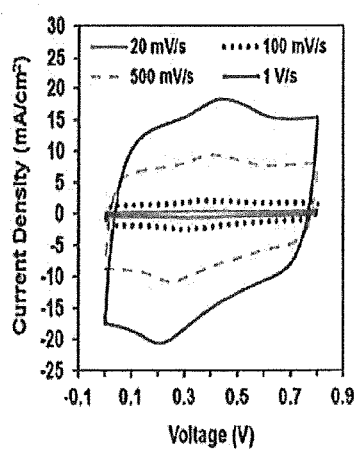
FIGS. 9A-9E show test results for multiple embodiments of the energy storage device of FIG. 8C.
Figure 9B:
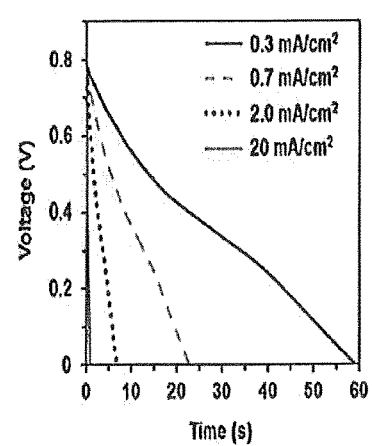
Figure 9C:
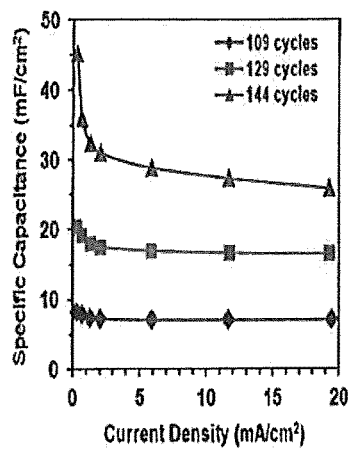

To this end, micro-supercapacitors 800 with different amount of PANI electrode 810, 814 were obtained by precisely controlling the numbers of deposition CV cycles, to achieve different specific areal capacitances. For the device obtained through 109 deposition cycles, from the CV curves at various scan rates of up to 1000 mV/s (FIG. 9A), a fine rectangular shape is seen even at a high scan rate of 1000 mV/s, indicating the exceptional rate capability of the nanostructured PANI electrodes. FIG. 9B shows the discharge plots at different current densities of up to 20 mA/cm$^2$, and the specific areal capacitance value vs. current density based on the entire device area is summarized in FIG. 9B. As the current density increases, the specific capacitance drops from 20.4 mF/cm$^2$ (at 0.3 mA/cm$^2$) to 17.5 mF/cm$^2$ (at 2.0 mA/cm$^2$), and then keeps a stable value of 19.3 mF/cm$^2$ (up to 20 mA/cm$^2$). It is noted that the maximum current density of 20 mA/cm$^2$ is much higher than those in previous literature (typically less than 5 mA/cm$^2$), and the capacitance loss is only 19.4% when the current density was increased by a factor of ~66 (0.3 to 20 mA/cm$^2$) indicating the exceptional rate capability with high power performance of our micro-supercapacitors arisen from the excellent porous structure of PANI nanowires. Micro-supercapacitors obtained though different numbers of deposition CV cycles were then tested, to see how the amount and micro-morphology of PANI electrode influences the energy storage performances. In FIG. 9C, as the number of deposition CV cycles increases, the device specific capacitance obtained at a low current density of 0.3 mA/cm$^2$ increases (8.1 mF/cm for 109 cycles, 20.4 mF/cm for 129 cycles, and 45.2 mF/cm for 144 cycles).

We found that the obtained device specific capacitance shows a well linear relationship with the discharge current of the last cycle of CV curve (extracted from the CV curve at 0 V for the discharge segment) during the PANI deposition process, indicating the controllability of the device capacitance through adjusting the electrochemical polymerization parameters. In addition, as the specific capacitance of the device increases, the capacitance retention within the same current density range becomes poorer to be 87.6%, 80.6%, and 57.1%, respectively. The degradation of the rate capability is attributed to the aggregation of PANI nanowires, i.e., at 109 cycles, PANI forms a uniform coating layer on the gold current collector with a small amount of thin PANI nanofibers attaching on the electrode surface; as the number of deposition CV cycles increases, more PANI grows on the electrode surface and PANI nanofibers become thicker, which leads to poorer electron transportation from the upper PANI electrode to the bottom current collector. This is also illustrated by the distortion level of CV curves at a high scan rate of 1000 mV/s, i.e., devices with thicker PANI electrodes display a much more distorted CV curve.

Figure 9D:
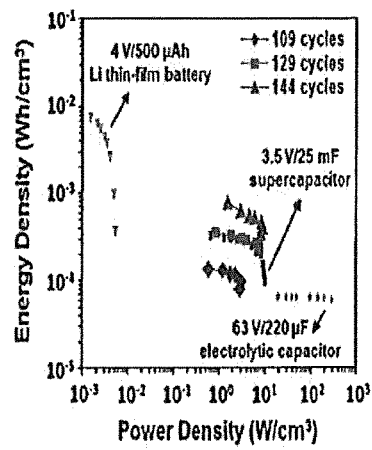
Figure 9E:
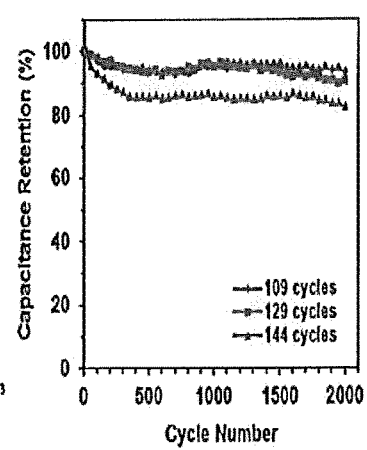

FIG. 9D shows the Ragone plots of the compact micro supercapacitor devices, which compares the supercapacitors 800 with various commercially available energy storage devices. The supercapacitive electrode material typically accounts up to 30% of the total mass of a packaged supercapacitor device. Thus, in addition to the active electrode material, all the other device components (including current collectors, electrolyte, separator, binder, packaging and connectors) should be considered for calculating power and energy densities, to show a true performance during practical applications. Within the testing current density range, compared with the commercial bulky 25-mF supercapacitor, a higher energy density of 0.78 mWh/cm$^3$ is achieved for the device obtained through 144 deposition CV cycles, and this value is one-order of magnitude higher than that of the electrolytic capacitor. On the other hand, a power density of up to 8 W/cm$^3$ is obtained, which is three-orders of magnitude higher than that of the 500 µAh thin-film lithium batteries. Thus, the compact microsupercapacitor still keeps an outstanding energy and power delivery performance when the size goes down to <1 mm$^2$. FIG. 9E shows the cycle stability of the device. After 2000 consecutive charge/discharge cycles, the capacitance of the device obtained through 109 deposition CV cycles exhibits only a minor decay of 6.9%. As the number of deposition CV cycles increases, the capacitance retention becomes poorer (i.e., 90.6% for 129 cycles and 82.2% for 144 cycles), which is attributed to the highly repeated swelling/shrinking process of the polymer structure during the charge/discharge (doping/de-doping of PANI) cycles. The inferior electrochemical stability of electrically conducting polymers can be enhanced through compositing the polymer on a stable porous carbon template, which is usually done in bulky supercapacitors.

Besides the merit of being mechanically flexible and sufficiently compact, the all-solid-state micro-supercapacitor 800 also has a tailorable shape. The devices reserve a good supercapacitive performance after they are cut into smaller pieces, as long as each remaining device includes the two through-LCP via interconnects 812, 816 between the topside electrodes 810, 814 and backside electrical contact pads 824, 826. Micro-supercapacitors obtained through 129 deposition CV cycles are used to demonstrate the advantage of being tailorable. The electrochemical performance of the devices with different sizes (~720 11 m×720 11 m, 720 11 m×490 11 m, and 720 11 m×290 11 m) obtained from the same original device is evaluated before each cut action (FIG. 10A). In FIG. 10B, as the device size decreases, the output current of the CV curve decreases almost proportionally to the reduction of the PANI electrode area. The accurate capacitances are calculated through the galvanostatic discharge plots (FIG. 10C) and summarized in FIG. 10D. The good linear relationship of the device capacitance and the electrode area indicates that the growth of the nanostructured PANI 810, 814 on the metallization current collector 812, 816 is highly uniform, which is essential for providing a promising way of obtaining tiny micro-supercapacitors with desired device capacitance by simply cutting them into an appropriate device size.

Figure 11A:
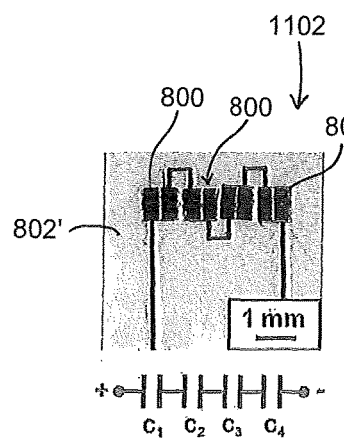
FIG. 11A shows a top plan view and schematic diagram of a module incorporating four energy storage devices of FIG. 8C coupled in series.
Figure 11B:
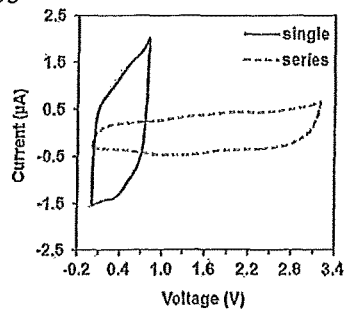
FIGS. 11B-11C show various test results for the module of FIG. 11A.
Figure 11C:
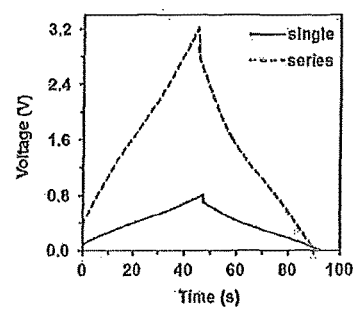
Figure 11D:
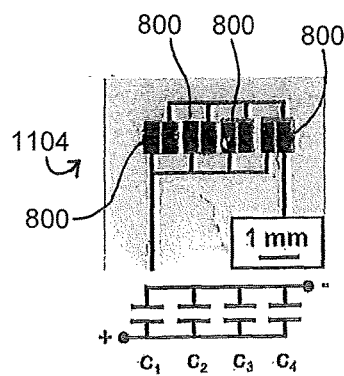
FIG. 11D shows a top plan view and schematic diagram of a module incorporating four energy storage devices of FIG. 8C coupled in parallel.

Finally, to enable the micro-supercapacitors 800 towards application level, we build up compact micro-supercapacitor modules 1102, 1104 made of several single devices 800 and evaluate their energy storage performances as shown in FIGS. 11A and 11D. For practical miniature systems applications, electronic components requires power supplies packaged either in series, in parallel, or in combinations of the two, to meet various energy and power demands. Thus, it is desirable that microsupercapacitor modules 1102, 1104 exhibit controllable output voltage and current by using serial and parallel assemblies while keeping the whole power supply system sufficiently compact with minimal energy and power losses. To the best of our knowledge, for micro-supercapacitors, currently there has been only one report on the testing of their assemblies in series and in parallel. However, the size of their single micro-supercapacitor device was estimated to be 4.9 mm×4.8 mm, which is still relatively large for miniature applications. Moreover, the practical area of the whole micro-supercapacitor module was much larger than the sum of the effective area of single device, owing to the existence of large electrical contact pads required to connect single devices, which heavily reduced the practical energy storage performance. In this work, we assemble four single micro-supercapacitors 800 (each size: 720 μm×720 μm, devices obtained through 129 deposition CV cycles) as closely as possible to each other on a patterned flexible LCP substrate 802', to achieve a sufficiently compact micro-supercapacitor module within the size of 1 mm×4 mm (FIGS. 11A and 11D). Copper-line circuits (to make single devices in series or in parallel) are first designed and patterned on the substrate through a standard copper wet etching, and then separately fabricated micro-supercapacitors are surface-mounted on the patterned substrate through a flip-chip method (FINEPLACER@, FINETECH GmbH & Co., ±5 μm alignment accuracy) with the backside electrical contact pads of the device facing the pads on the substrate. This assembly well imitates a practical condition in which energy-storage devices are integrated on a microsystem board as to supply power to a co-packaged IC. For the four in-series module 1102 of FIG. 11A, as the CV curves in FIG. 11B shows, the micro-supercapacitor module exhibits a stable voltage window of up to 3.2 V, while a single device shows a maximum operating voltage of 0.8 V. But the output current of the in-series module 1102 is only a quarter of that of a single device at the same scan rate of 20 mV/s. From the galvanostatic charge/discharge curves (FIG. 11C), the micro-supercapacitor module 1102 indeed extends the voltage up to 3.2 V and keeps almost the same time for one charge/discharge cycle at the same current load of 1.5 μA. Therefore, for in-series, the maximum output voltage increases by four times while the overall capacitance decreases by a factor of four, which is as expected.

Figure 11E:
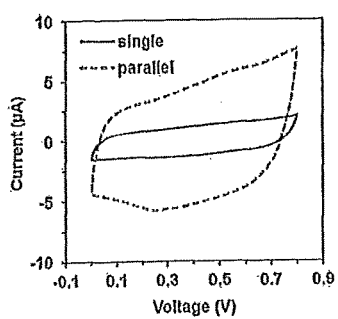
FIGS. 11E-11F show various test results for the module of FIG. 11D.
Figure 11F:
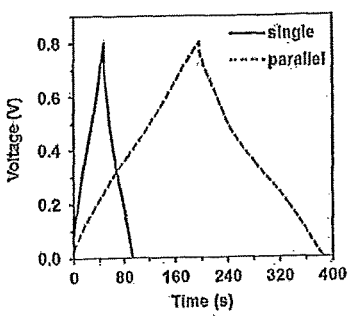

For the four in-parallel module 1104 of FIG. 11D, the output current of CV curve increased by a factor of four at the same scan rate of 20 mV/s with the same voltage window of 0 to 0.8 V (FIG. 11E), and the time for one galvanostatic charge/discharge cycle is four times that of a single device when operated at the same current load of 1.5 μA (FIG. 11F). Therefore, for in-parallel, the overall capacitance increases by four times while the output voltage keeps the same, which is also as expected. Herein, sufficiently compact micro-supercapacitor modules with designed energy storage performances are achieved, indicating their practical applications in providing versatile energy and power outputs for miniature electronic devices.

Prospectively, even superior performance could be achieved through further pursuits in scaling-down of the device, such as narrowing the spacing width between electrodes 804, 806 to further decrease internal resistance, and reducing the thickness of the polymer substrate 802 to further increase the overall energy and power density. On a final note, the novel fabrication strategy presented is not limited for achieving devices based on pseudo-capacitive PANI electrodes. Besides PANI, the electrochemical deposition method to form electrodes can be extended to other kinds of supercapacitive electrode material, such as porous carbon material (e.g., onion-like carbon and reduced graphene oxide), other electrically conducting polymers (e.g., polypyrrole (PPy) and polythiophene (PTh), and transition metal oxides (e.g., $MnO_2$ and $RuO_2$). Therefore, our approach potentially creates a solution for a broad range of compact micro-supercapacitors based on various super-capacitive electrode materials to meet various energy and power requirements.

In summary, the embodiment of FIG. 8C provides a sufficiently compact, flexible, and all-solid-state micro-supercapacitor using $H_2SO$-PVA polymer electrolyte 808 with a novel device configuration of backside electrical contact pads 824, 826. The entire device (i.e., the whole device package including electrodes, electrolyte, and electrical contact pads) has a tiny size of 720 μm×720 μm with a thickness of 50 μm. Electrochemical measurements show that the micro-supercapacitors possess a high specific areal capacitance, good rate capability, and stable cycle life. In addition, the capacitance of the device is able to be tailored by either depositing nanostructured PANI electrodes with different thickness or cutting the device into appropriate sizes. Moreover, the output voltage and current can be improved by achieving compact micro-supercapacitor modules made of several single devices in series or in parallel. Based on the superior mechanical, dimensional and energy-storage performances, the micro-supercapacitor presented is a promising energy storage unit, which can be integrated with an energy conversion device and microfunctional devices (e.g., wireless transmitter, biosensor, micro-electromechanical systems (MEMS) actuator) to produce a miniaturized autonomous-device system.

FIGS. 12A-12E show in further detail an exemplary fabrication method for the energy storage device 800 of FIG. 8C and similar devices. The fabrication strategy combines three key techniques: the "top-down" micro-fabrication of topside current collectors and backside electrical contact pads on LCP, and through-IEP via-hole connection between the two; "bottom-up" electrochemical polymerization of polyaniline (PANI) as supercapacitive electrodes; formation of all-solid-state device using $H_2SO_4$-PVA polymer electrolyte. Detailed fabrication process is summarized below:

FIG. 12A Formation of Through-LCP Via Holes.

A piece of liquid crystal polymer (LCP) is used as the flexible substrate 802 for the microsupercapacitors. The commercial LCP sheet (UL TLARAM 3850, Rogers Co.) is received with 18-μm-thick copper coating 1202 on both sides. Herein, the thick copper layer makes LCP strong enough to be self-standing. A Kapton tape 1204 is attached on one side of LCP, followed by the patterning of a copper mask 1202 for the via holes. Herein, the Kapton tape 1204 is used to protect the backside copper layer 1202 during the wet-etching process for the topside via-hole mask. Then, an oxygen plasma deep-etching process (Plasma-Tech RIE) is used to form the through-LCP via holes 820, 822 (empirical etching rate: 0.15-0.20 μm/min at 50 W, 50 sccm and 50 mTorr). Finally, the flexible LCP substrate 802 with via holes embedded in is released by detaching the Kapton tape 1204 and wet etching away copper 1202 on both sides, washed with acetone, methanol and IPA, and air dried.

FIG. 12B Formation of Backside Electrical Contact Pads and Topside Current Collectors, and Connection Between the Two.

Current collectors and pads are patterned by the standard micro-fabrication techniques, including metal deposition, photolithography, developing, and wet etching. In details, for ease of handling the thin, flexible LCP substrate, it is bonded on a Si wafer 1206 with a thin photoresist layer (PR, AZ1518, 4 µm) as an adhesive, followed by the Ti/Au (50 nm/500 nm) deposition and patterning of the pads. Herein, a metal sputtering system (MANTIS Deposition Ltd.) is used for metallization to secure the through-via metal interconnect, taking advantage of the good step-coverage of sputtering. After released, washed and dried, LCP is flipped over and re-boned on the Si wafer 1206, followed by the Ti/Au (50 nm/300 nm) deposition and patterning of the topside current collectors 812.

FIG. 12C Growth of Super Capacitive Nanostructured PANI Electrodes.

An electrochemical polymerization process (GAMRY Reference 600™) is employed based on a typical three-electrode setup with the patterned current collectors as the working electrode, a platinum mash as the counter electrode, and an Ag/AgCl electrode as the reference electrode. A solution of 0.1 M aniline monomer in 0.5 M $H_2SO_4$ is used as the electrolyte solution. Herein, the backside pads were sealed between LCP and Si wafer, so PANI is only deposited on the topside current collectors. PANI polymerization is performed potentiodynamically at a scan rate of 100 mV/s between a potential window of 0 to 0.85 V (vs. Ag/AgCl) at room temperature. The number of the cyclic voltammetry (CV) cycles can be controlled to obtain desired amount of PANI and in turn different electrode thickness. Finally, the patterned PANI electrodes are slightly washed with deionized water and ethanol, and dried at 80° C. for 4 hours.

FIG. 12D Coating of Solid-State Electrolyte.

A diluted solution of $H_2SO_4$-PVA electrolyte is prepared in advance as follows: Polyvinyl alcohol (PVA) powder (molecular weight 89,000-98,000, 99% hydrolyzed, Sigma-Aldrich, 1 g) is added to deionized water (10 g), and then heated steadily to about 90° C. under vigorous stirring until the mixed solution turned clear. After cooling down under ambient conditions, concentrated sulfuric acid (ACS reagent, 95-98%, Sigma-Aldrich, 0.8 g) is added, and the mixed solution is stirred thoroughly. Afterward, the dilute $H_2SO_4$-PVA solution was dropped and coated on the entire surface of LCP 802, and the assembly is left under ambient conditions for 5 hours to ensure that the electrolyte completely wetted the porous electrode and to allow for evaporation of excess water, leading to a solid-state electrolyte layer.

FIG. 12E Device Outline Cutting.

The LCP sheet embedded with multiple micro-supercapacitors is released from the Si wafer by immersing the system in acetone for 1 h, followed by washing and air drying. During the process, acetone thoroughly washes the PR away, making the backside pads fully open. Finally, each single micro-supercapacitor device is carefully cut off from the polymer substrate using a razor blade.

Flip-chip bonding is a method used in the semiconductor IC industry to attach a chip (die) onto a system circuit board (host board). Flip-chip bonding is typically preferred over wire-bonding (a more generally used chip attachment method) when a smaller footprint and less interconnect parasitic are desired. In flip-chip bonding, a chip is flipped over and mounted at a desired location on the host board through an accurate alignment. The electromechanical bondage between a chip and a host board is generally achieved by a high-temperature, high-pressure thermo-compression, but alternatively, conductive adhesives can be used instead of thermocompression to achieve a low-temperature and damage-free bonding. In this work, this low temperature, damage-free flip-chip bonding technique is utilized to attach the microsupercapacitors on an LCP test board, which is a good mimic of a miniature system integration on a flexible board.

To prepare the conductive adhesive, uniformly mix silver epoxy (118-09 Part A, CREATIVEMATERIALS Inc.) with epoxy curative (118-09 Part B) by a mixture ratio of 100:1.5 (by weight). Add thinner (CMI 113-12) to adjust the liquidity. Then, apply a tiny amount of adhesive on the on-board bonding pads connected to the testing circuitry using a tiny needle under careful observation through a microscope. Thereafter, mount the micro-supercapacitors on the on-board testing circuitry using a flip-chip machine (FIN-EPLACER@, FINETECH GmbH & Co., ±5 11 m alignment accuracy). Finally, cure the samples in an oven at 80° C. for 4 h to enhance the electrical conductivity of the adhesive.

Figure 13:
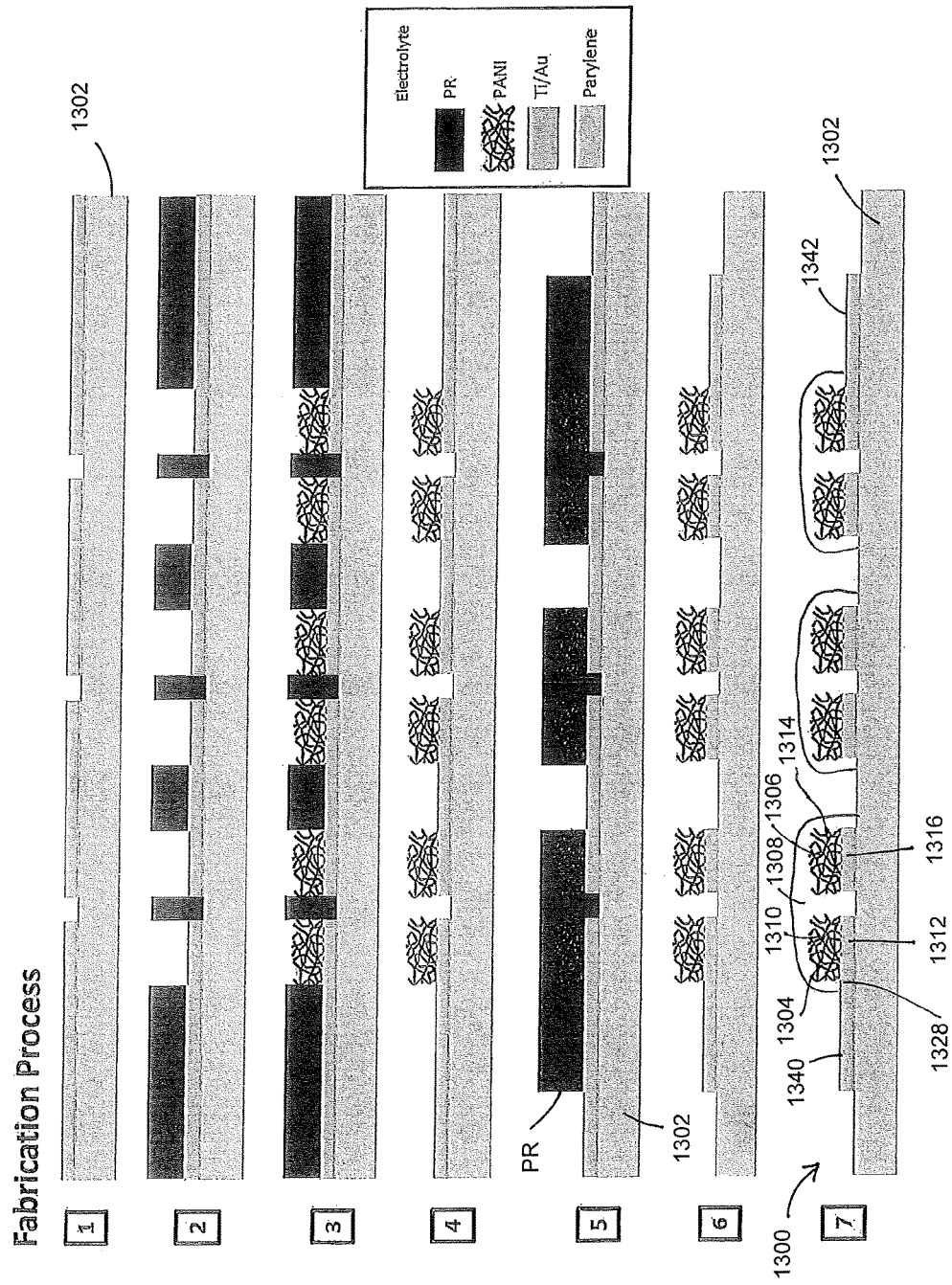
FIG. 13 shows a detailed process for fabricating yet another embodiment of an energy storage device according to the invention, and the energy storage device.

FIG. 13 illustrates a fabrication process for an energy storage device module 1300 that includes three energy storage devices 1300a, 1300b, 1300c, each similar to supercapacitor 800, of FIG. 8C, but which are disposed on a rigid substrate 1302 as opposed to a flexible substrate.

Each of the storage devices 1300a, 1300b, 1300c is a supercapacitor. The supercapacitors 1300a, 1300b, 1300c are connected in parallel or series by conductive elements, not shown, to form the module 1300. (See, however, FIGS. 11A and 11D. The module 1300 includes a first terminal 1340 and a second terminal 1342. The first energy storage device 1300a is disposed on a substrate 1302, and includes a first electrode 1304, a second electrode 1306, and a solid state electrolyte 1308. The first electrode 1304 includes a layer including a conductive polymer 1310 and a metallization layer 1312. The first electrode 1304 is disposed on the substrate 1302. The second electrode 1306 includes a layer including a conductive polymer 1314 and a metallization layer 1316, and is disposed on the substrate 1302. The solid state electrolyte 1308 is disposed at least between and contacting the first electrode 1304 and the second electrode 1306.

In this embodiment, the substrate 1302 is a rigid substrate, such as that which may be used as a structural element of a prosthetic device, constructed of metal or a hard polymer. The substrate 1302 may also be another implantable device, such as a bone graft, or a rigid housing or case for an implant. As shown in FIG. 13, the solid state electrolyte 1308 covers the first electrode 1304 and the second electrode 1306, and such that the solid state electrolyte 1308 and the substrate 1302 substantially encapsulate the first electrode 1304 and the second electrode 1306.

In contrast to the embodiment of FIG. 8C, contact is made to the electrodes through side via 1328 between the electrolyte 1308 and the substrate 1302. In FIG. 13, only the first terminal 1340 and the second terminal 1342 of the third device 1300c show these through-contacts. However, it will be appreciated that the devices 1300a, 1300b and 1300c may have additional vias to allow contacts between their respective electrodes to allow the parallel or serial connection among the devices 1300a, 1300b, 1300c, not visible in FIG. 13.

Steps 1-7 illustrate the fabrication process of the device, wherein the electrolyte may suitably be ionic liquid and polyvinylidene fluoride-co-hexa-fluoropropylene and the PR is photoresist. As illustrated in step 5, the photoresist PR may be used to pattern the metallization that will form the contacts 1340, 1342 and the contact portions 1312 and 1316 of the electrodes 1304, 1306.

It will be appreciated that the above-described embodiments are merely illustrative, and that those of ordinary skill in the art may readily devise their own implementations and modifications that incorporate the principles of the present invention and fall within the spirit and scope thereof.

We claim:

1. An energy storage device, comprising:
   a first electrode comprising a first plurality of carbon nanotubes, a first metallization layer disposed on said first plurality of carbon nanotubes, and a first conductive polymer disposed on said first metallization layer;
   a second electrode comprising a second plurality of carbon nanotubes a second metallization layer disposed on said second plurality of carbon nanotubes, and a second conductive polymer disposed on said second metallization layer; and
   a solid state electrolyte disposed at least in part between the first electrode and the second electrode,
   wherein the first metallization layer and the first conductive polymer are permeated throughout the first plurality of carbon nanotubes,
   wherein the first metallization comprises a gold metallization at a thickness of 300 nm applied by sputtering, and
   wherein an energy storage device formed of the first electrode and the second electrode can form any shape having a cross sectional area down to 1 mm$^2$.

2. The energy storage device of claim 1, wherein the first conductive polymer of the first electrode is disposed at least in part between the first plurality of carbon nanotubes of the first electrode and the solid state electrolyte.

3. The energy storage device of claim 2, wherein the first conductive polymer of the first electrode includes polyaniline.

4. The energy storage device of claim 1, wherein the solid state electrolyte is formed from polyvinylidene fluoride-co-hexa-fluoropropylene.

5. A method of fabricating at least a part of an energy storage device, comprising:
   a) providing a first layer of conductive carbon nanostructures;
   b) applying metal by sputtering to the first layer of conductive carbon nanostructures;
   c) providing polyaniline on the first layer of conductive carbon nanostructures and the applied metal to form a first electrode; and
   d) forming a solid state electrolyte on the first electrode,
   wherein the metal and the polyaniline are permeated throughout the first layer of conductive carbon nanostructures,
   wherein the metal comprises gold at a thickness of 300 nm, and
   wherein an energy storage device formed of the first electrode can form any shape having a cross sectional area down to 1 mm$^2$.

6. The method of claim 5, wherein step d) further includes immersing the first electrode in a solution containing an electrolytic mixture.

7. The method of claim 6, wherein step d) further includes curing the solid state electrolyte on the first electrode after removing the first electrode from the electrolytic mixture.

8. The method of claim 6, wherein the electrolytic mixture includes an acid and polyvinyl alcohol.

9. The method of claim 5, wherein step a) further comprises providing the first layer of conductive carbon nanostructures as a plurality of carbon nanotubes.

10. A wireless power management arrangement in a receiver for implantable medical devices, comprising:
    an energy harvesting apparatus to include thermal, mechanical, and electromagnetic harvesting, the energy harvesting apparatus configured to receive energy wirelessly and generate electrical energy;
    a first capacitor coupled to receive the generated electrical energy and configured to collect electrical charge associated with the received electrical energy, the first capacitor configured for reversible redox reactions at or near an electrode surface;
    a boost converter coupled to the first capacitor configured to boost voltage from the first capacitor; and
    a second capacitor operably coupled to the boost converter to collect electrical charge based on the boost voltage,
    wherein the first capacitor includes
        a first electrode comprising a first plurality of carbon nanotubes, a first metallization layer disposed on said first plurality of carbon nanotubes, and a first conductive polymer disposed on said first metallization layer;
        a second electrode comprising a second plurality of carbon nanotubes a second metallization layer disposed on said second plurality of carbon nanotubes, and a second conductive polymer disposed on said second metallization layer; and
        a solid state electrolyte disposed at least in part between the first electrode and the second electrode,
        wherein the first metallization layer and the first conductive polymer are permeated throughout the first plurality of carbon nanotubes,
        wherein the first metallization comprises a gold metallization at a thickness of 300 nm applied by sputtering, and
        wherein an energy storage device formed of the first electrode and the second electrode can form any shape having a cross sectional area down to 1 mm$^2$.

11. The wireless power management arrangement of claim 10, wherein the energy harvesting apparatus comprises an antenna and an RF rectifier, and wherein the first capacitor is operably coupled to receive rectified RF energy from the RF rectifier.

12. The wireless power arrangement of claim 10, wherein the second capacitor is configured to regulate the boost voltage.

* * * * *